(12) United States Patent
Maruyama et al.

(10) Patent No.: US 8,787,728 B2
(45) Date of Patent: Jul. 22, 2014

(54) DATA REPRODUCTION APPARATUS AND DATA REPRODUCTION CONTROL METHOD

(75) Inventors: Koji Maruyama, Akishima (JP);
Mitsutaka Kuwabara, Fukaya (JP);
Satoshi Kataoka, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 790 days.

(21) Appl. No.: 12/538,011

(22) Filed: Aug. 7, 2009

(65) Prior Publication Data

US 2010/0034525 A1 Feb. 11, 2010

(30) Foreign Application Priority Data

Aug. 8, 2008 (JP) ................................. 2008-205823

(51) Int. Cl.
*H04N 5/765* (2006.01)

(52) U.S. Cl.
USPC ............ 386/232; 382/298; 382/299; 348/441

(58) Field of Classification Search
USPC ........... 386/240, 241, 232; 348/558; 345/698, 345/699, 441, 448, 458, 554, 565, 581; 382/254, 298–300
See application file for complete search history.

(56) References Cited

U.S. PATENT DOCUMENTS

| | | | | |
|---|---|---|---|---|
| 5,255,097 A * | 10/1993 | Spiero et al. | | 348/706 |
| 5,491,561 A | 2/1996 | Fukuda | | |
| 6,788,347 B1 * | 9/2004 | Kim et al. | | 348/441 |
| 6,791,624 B1 * | 9/2004 | Suga | | 348/588 |
| 7,006,963 B1 * | 2/2006 | Maurer | | 703/21 |
| 7,050,118 B2 * | 5/2006 | Okada et al. | | 348/731 |
| 7,110,027 B2 * | 9/2006 | Wyman | | 348/231.9 |
| 7,268,820 B2 * | 9/2007 | Honda et al. | | 348/441 |
| 2001/0019365 A1 * | 9/2001 | Kim et al. | | 348/554 |
| 2003/0112367 A1 * | 6/2003 | Kang et al. | | 348/441 |
| 2004/0017481 A1 | 1/2004 | Takasumi et al. | | |

(Continued)

FOREIGN PATENT DOCUMENTS

| | | |
|---|---|---|
| JP | 2001-014119 | 1/2001 |
| JP | 2004-229004 | 8/2004 |

(Continued)

OTHER PUBLICATIONS

Notice of Reasons for Rejection mailed by JPO on Oct. 20, 2009 in the corresponding Japanese patent application No. 2008-205823.

(Continued)

*Primary Examiner* — Hung Dang
*Assistant Examiner* — Mishawn Dunn
(74) *Attorney, Agent, or Firm* — Knobbe, Martens, Olson & Bear LLP

(57) ABSTRACT

According to one embodiment, a data reproduction apparatus comprises a reproduction module configured to reproduce image data, a resolution selection module configured to select one of resolutions, an image quality mode selection module configured to select on or off state of an image quality mode, a selection disable module configured to disable the resolution selection module to select a prescribed resolution when the image quality mode selection module selects the on state of the image quality mode, and an image processor configured to improve a quality of the image data reproduced by the reproduction module in accordance with the resolution selected by the resolution selection module when the image quality mode selection module selects the on state of the image quality mode.

14 Claims, 21 Drawing Sheets

(56) References Cited

U.S. PATENT DOCUMENTS

| | | | |
|---|---|---|---|
| 2005/0024534 A1* | 2/2005 | Honda et al. | 348/441 |
| 2005/0281538 A1* | 12/2005 | Jin | 386/83 |
| 2006/0012616 A1* | 1/2006 | Paek | 345/698 |
| 2006/0056716 A1* | 3/2006 | Komeno | 382/233 |
| 2006/0221246 A1* | 10/2006 | Yoo | 348/581 |
| 2006/0268169 A1* | 11/2006 | Han | 348/458 |
| 2007/0116441 A1 | 5/2007 | Hayashibara | |
| 2007/0223059 A1 | 9/2007 | Oishi | |
| 2007/0280646 A1* | 12/2007 | Seita et al. | 386/96 |
| 2009/0059073 A1* | 3/2009 | Cho et al. | 348/565 |

FOREIGN PATENT DOCUMENTS

| | | |
|---|---|---|
| JP | 2006-222958 | 8/2006 |
| JP | 2006-333319 | 12/2006 |
| JP | 2007-150469 | 6/2007 |

OTHER PUBLICATIONS

Notice of Reasons for Rejection mailed by JPO on Feb. 9, 2010 in the corresponding Japanese patent application No. 2008-205823. Explanation of Non-English Language Reference(s).

\* cited by examiner

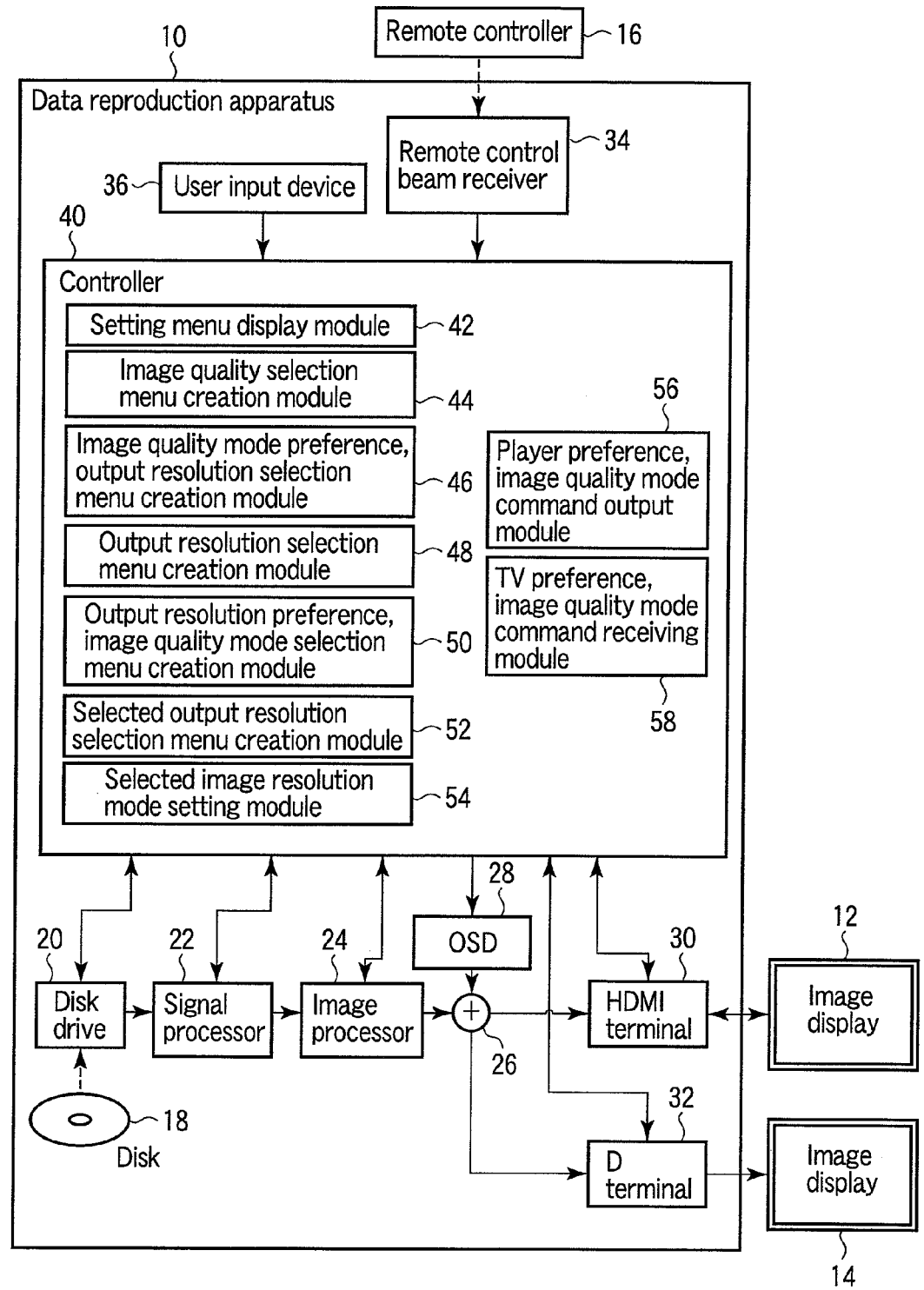
F I G. 1

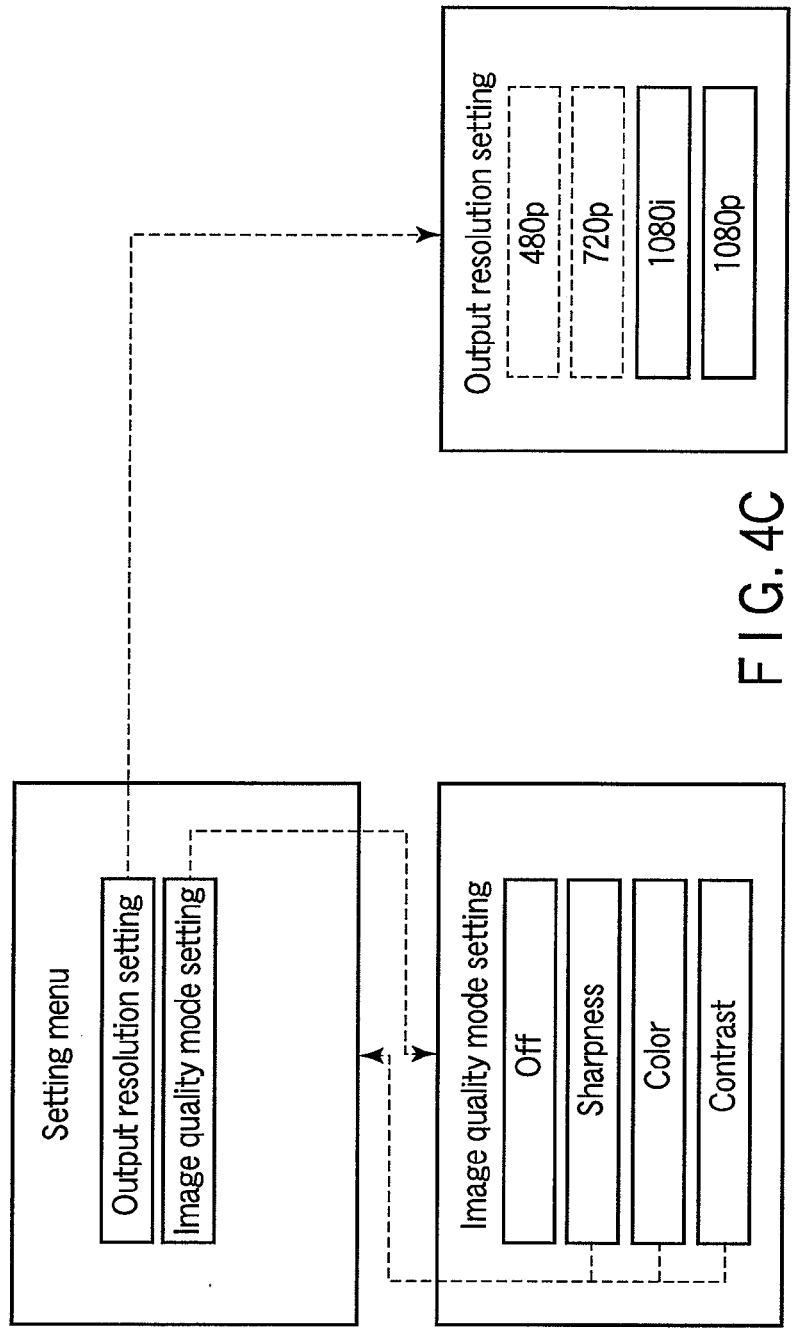

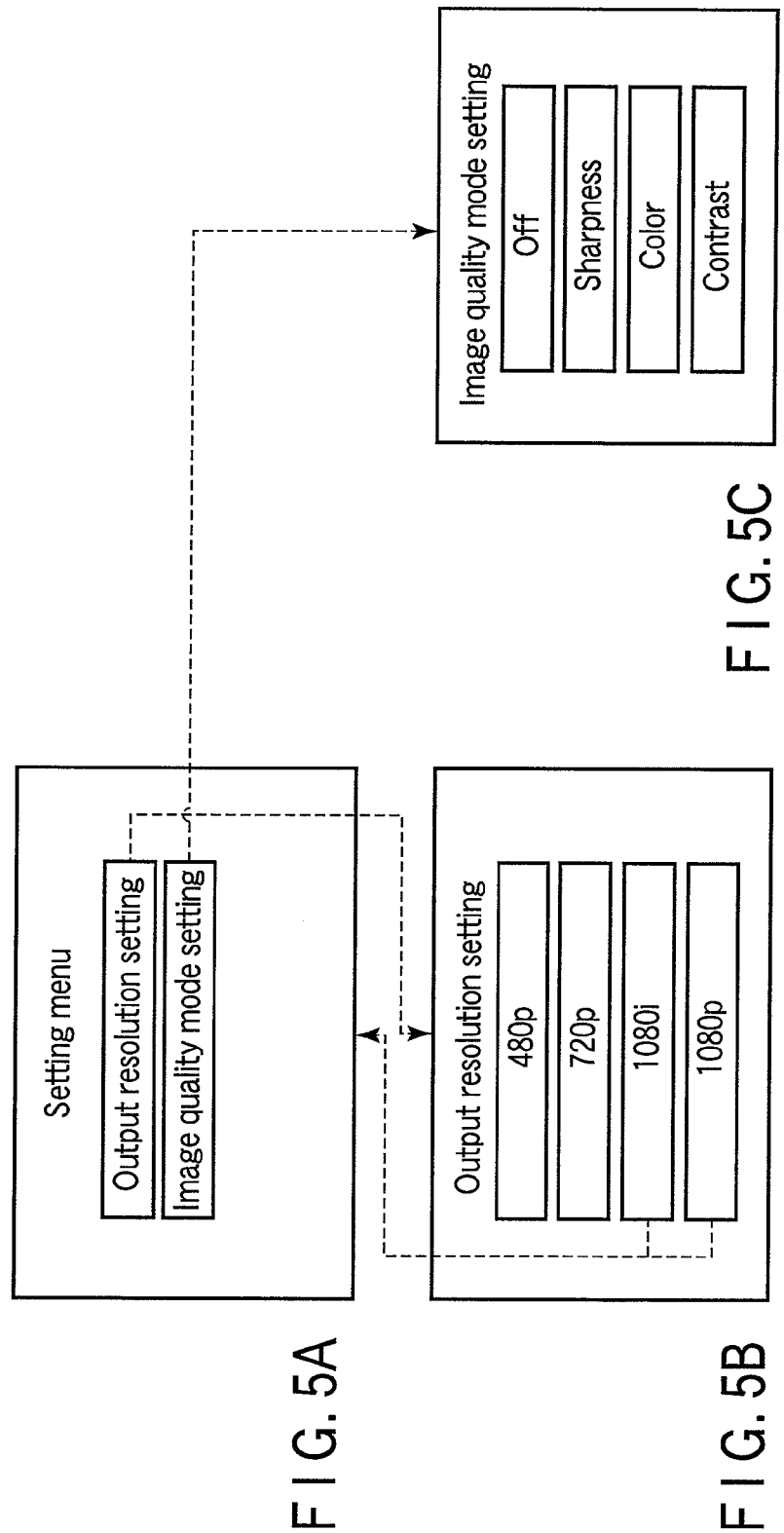

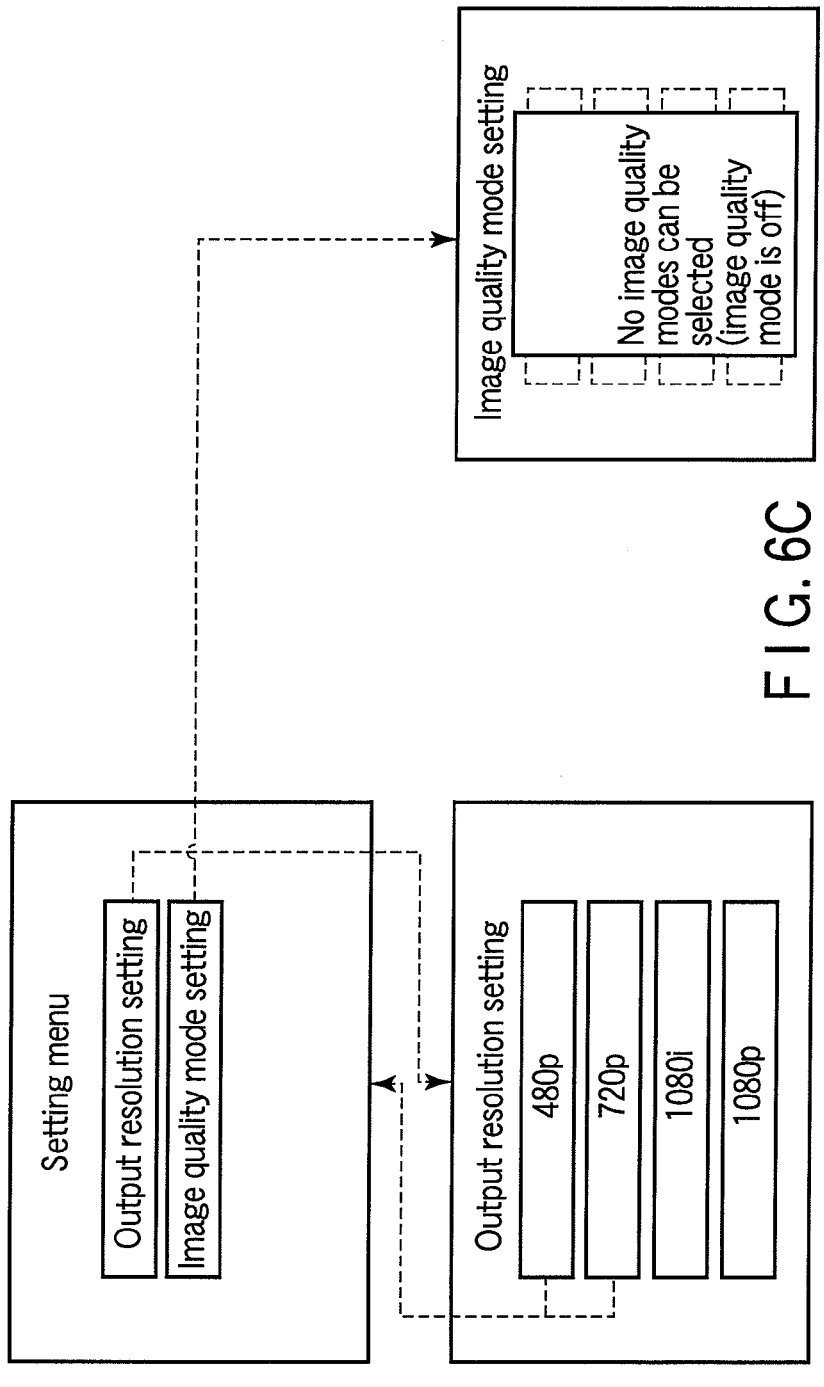

| Image quality mode setting | Output resolution setting | | | |
|---|---|---|---|---|
| | 480p | 720p | 1080i | 1080p |
| Off | ○ | ○ | ○ | ○ |
| On | × | × | ○ | ○ |

FIG. 7

| Output resolution setting | Image quality mode setting |
|---|---|
| 480p | × |
| 720p | × |
| 1080i | ○ |
| 1080p | ○ |

FIG. 8

| Image quality mode setting | Output terminal setting | | | | |
|---|---|---|---|---|---|
| | D1 | D2 | D3 | D4 | D5 |
| | 480i | 480p | 1080i | 720p | 1080p |
| Off | ○ | ○ | ○ | ○ | ○ |
| On | × | × | ○ | × | ○ |

FIG. 9

| Output terminal setting | | Image quality mode setting |
|---|---|---|
| D1 | 480i | × |
| D2 | 480p | × |
| D3 | 1080i | ○ |
| D4 | 720p | × |
| D5 | 1080p | ○ |

FIG. 10

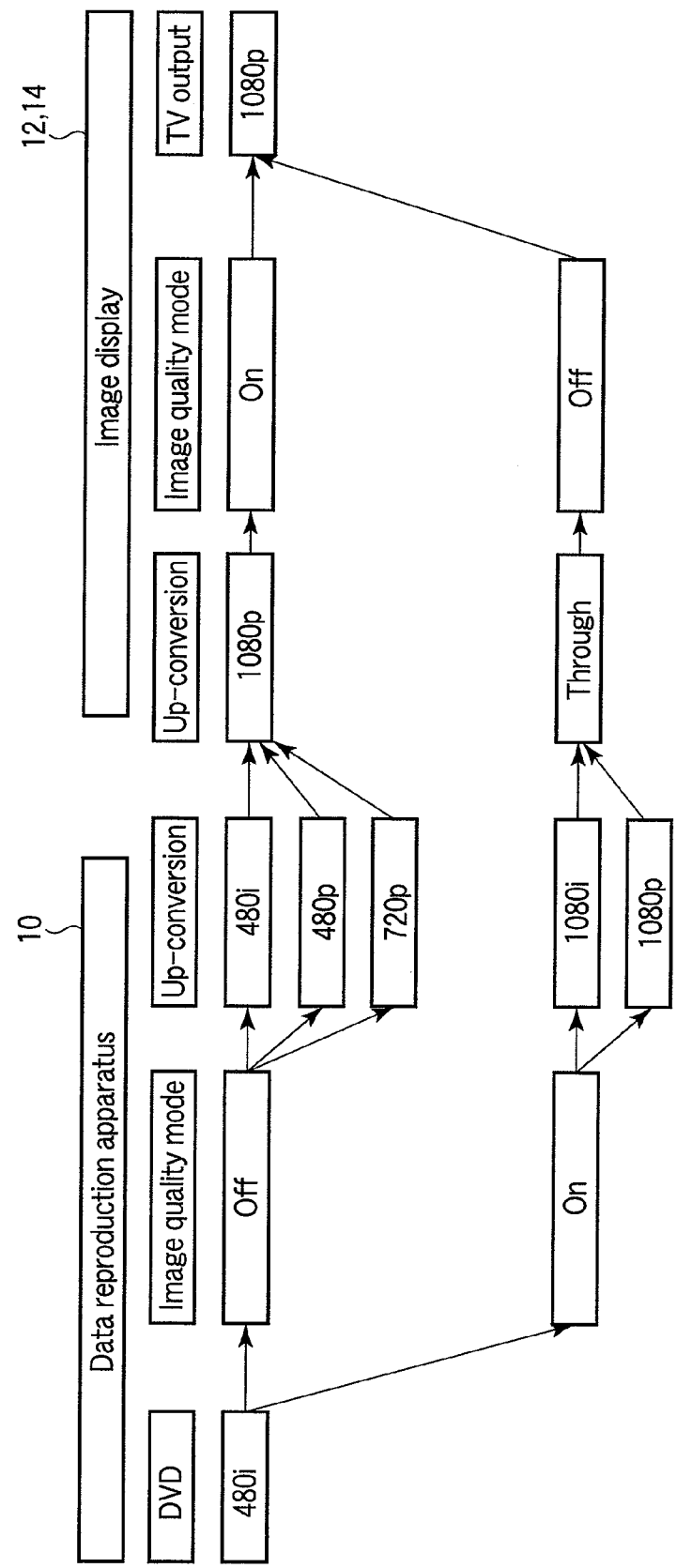
F I G. 11

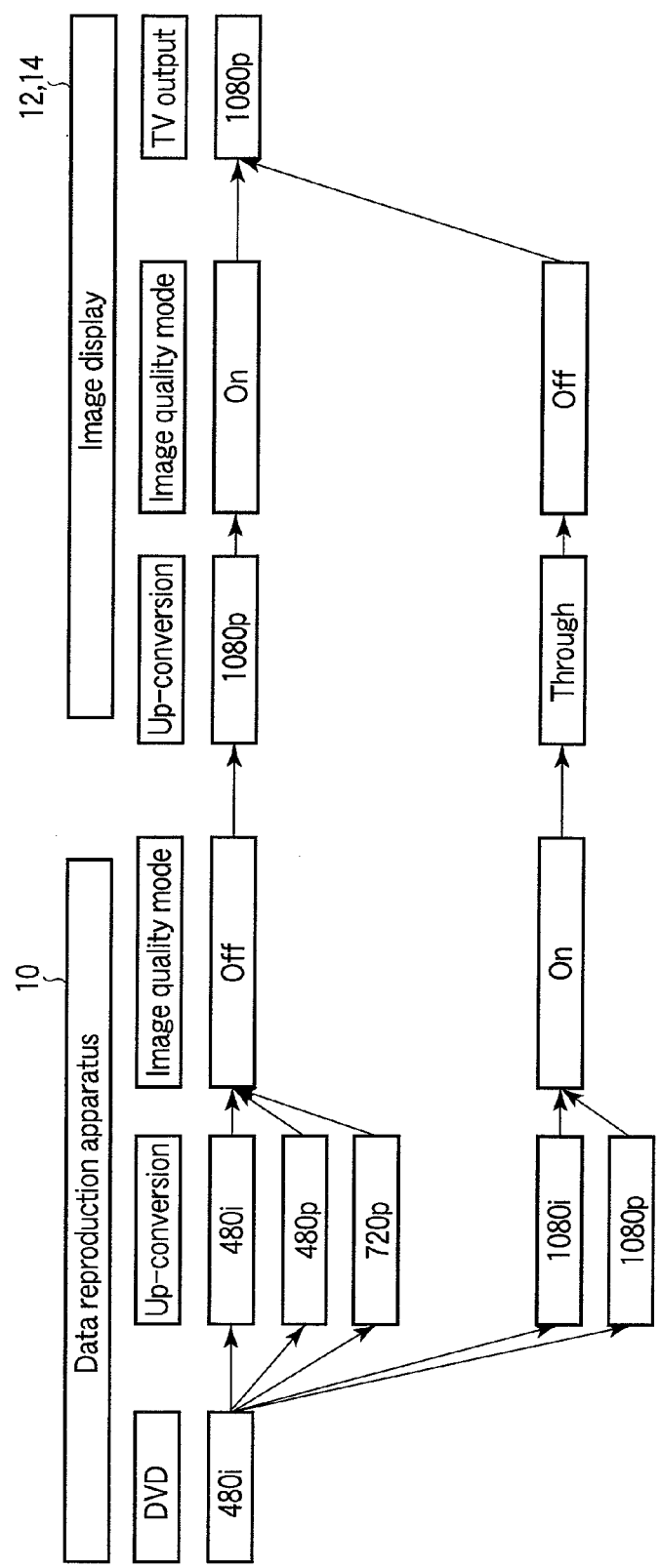
F I G. 12

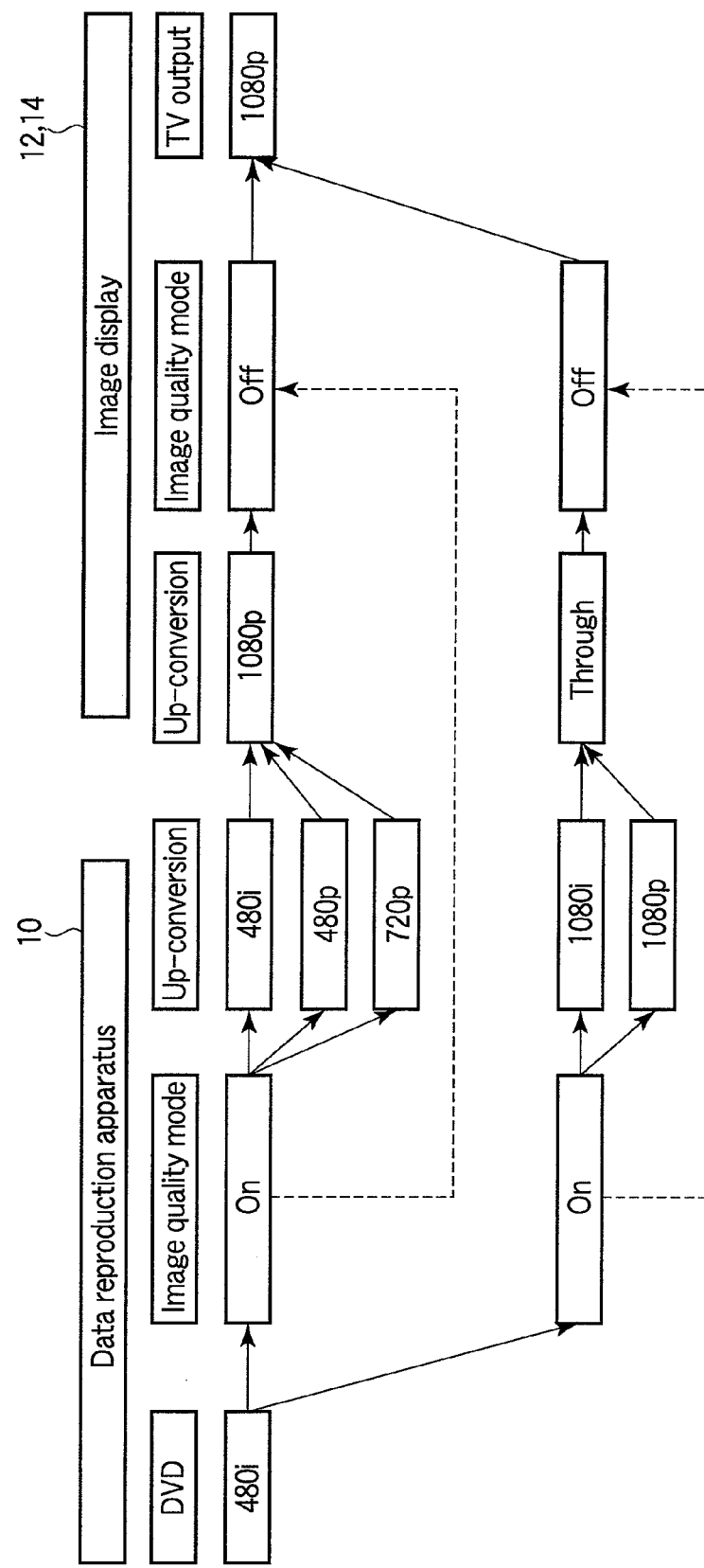
F I G. 14

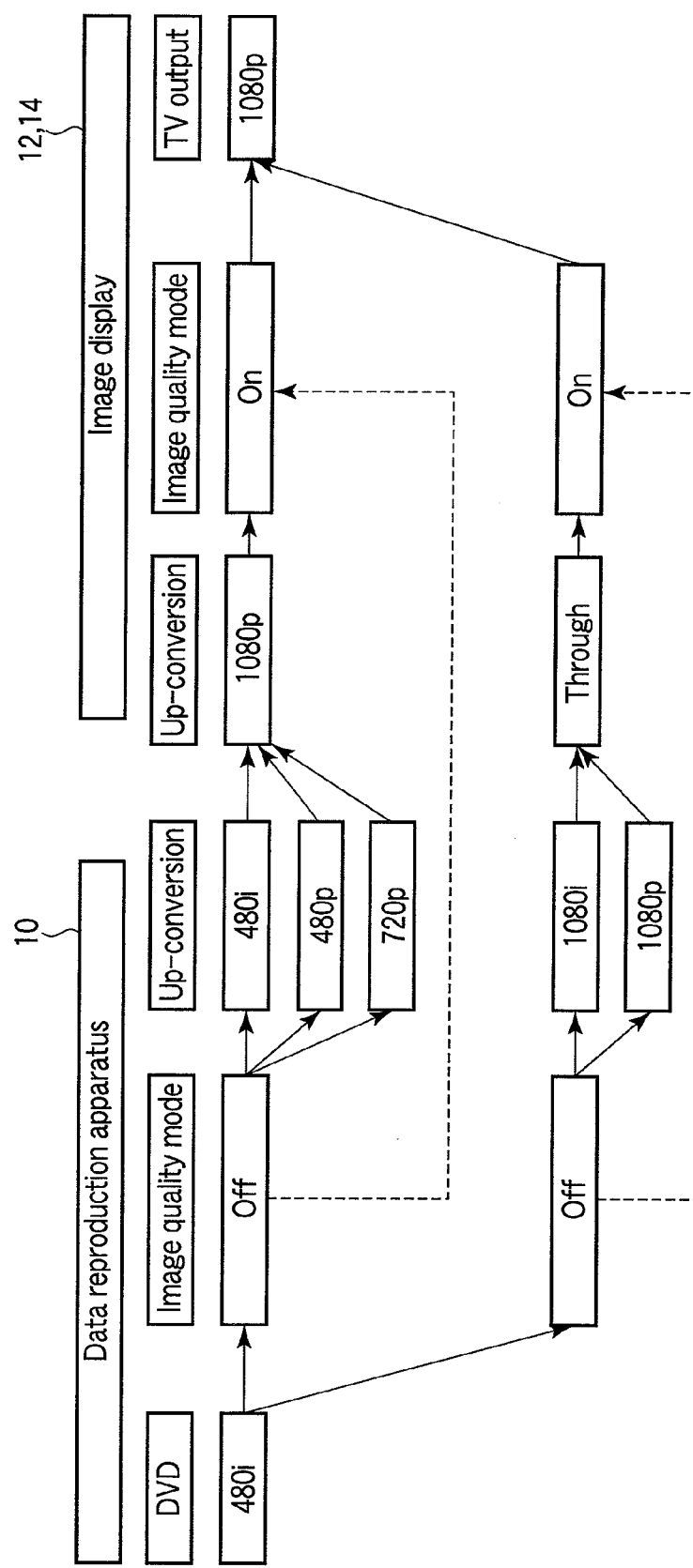
F I G. 15

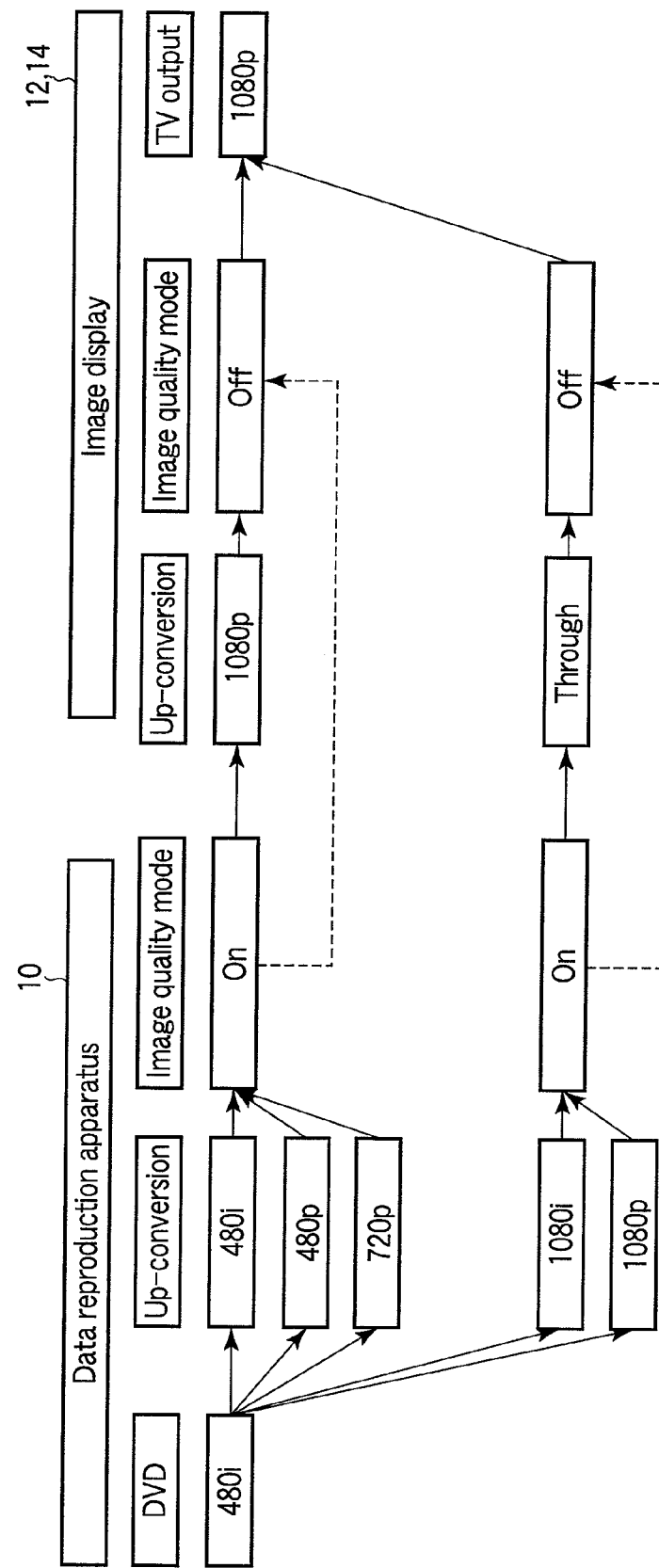
F I G. 16

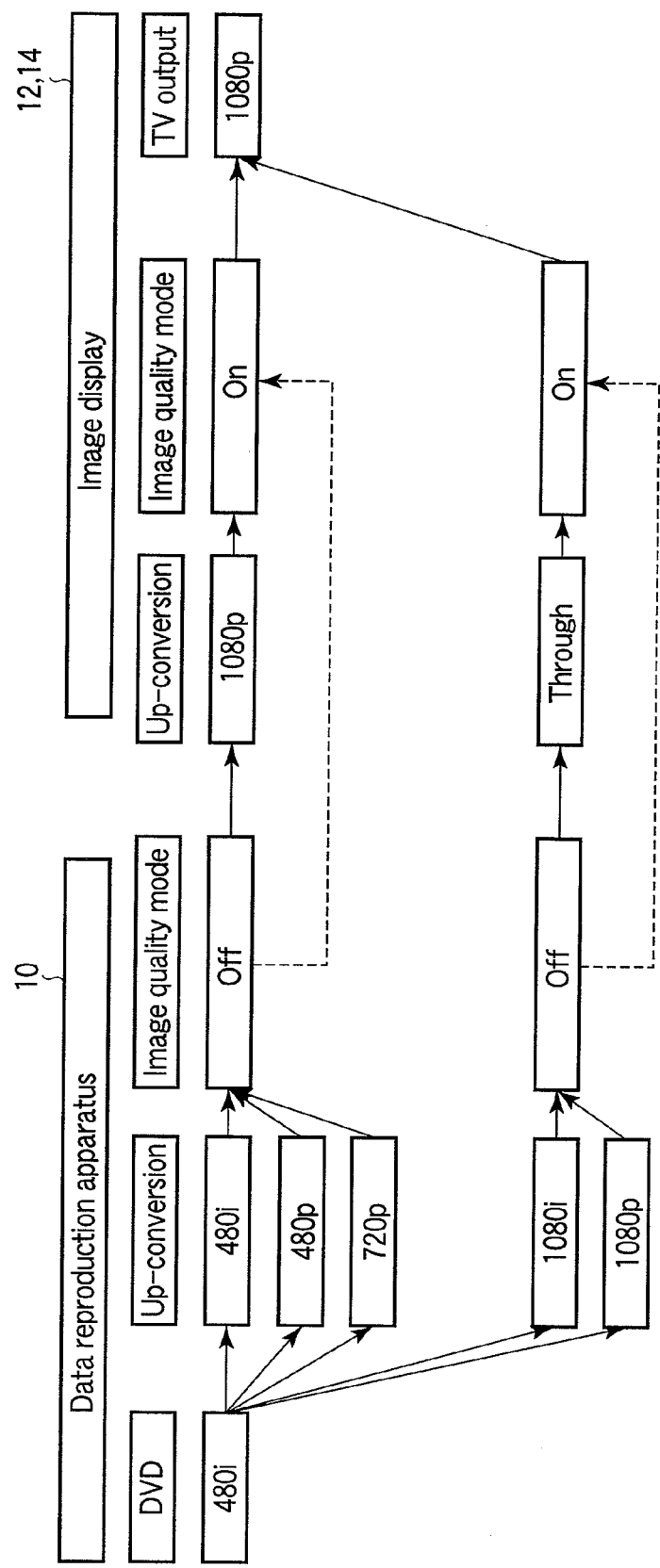
F I G. 17

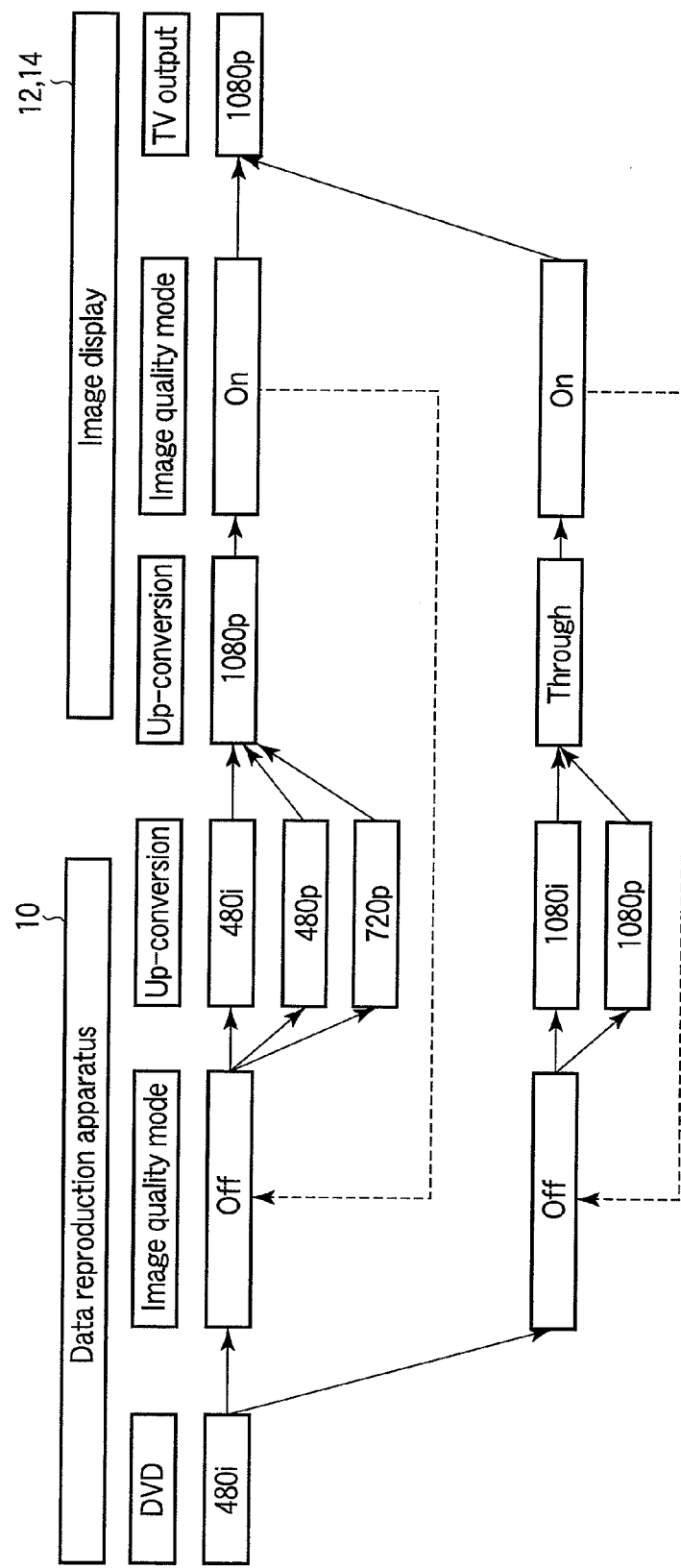
F I G. 19

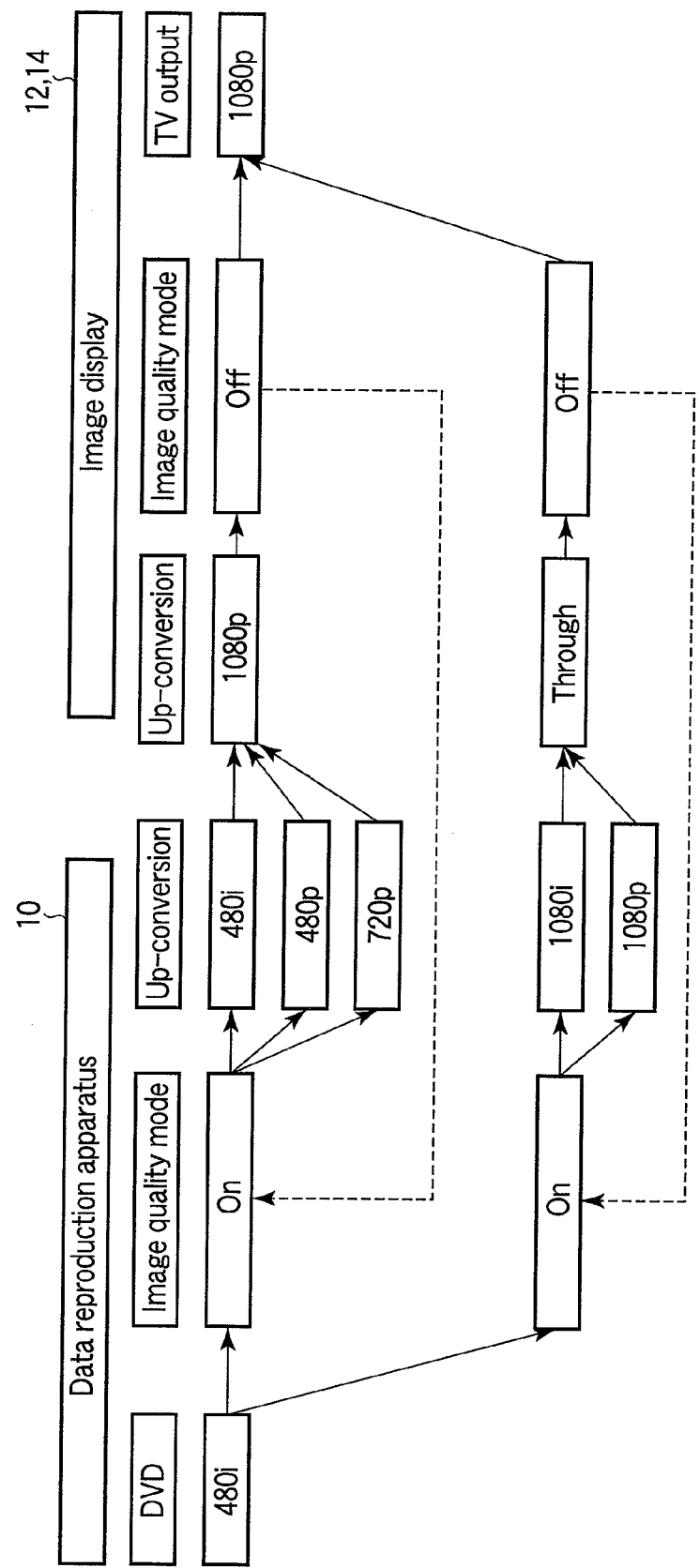
F I G. 20

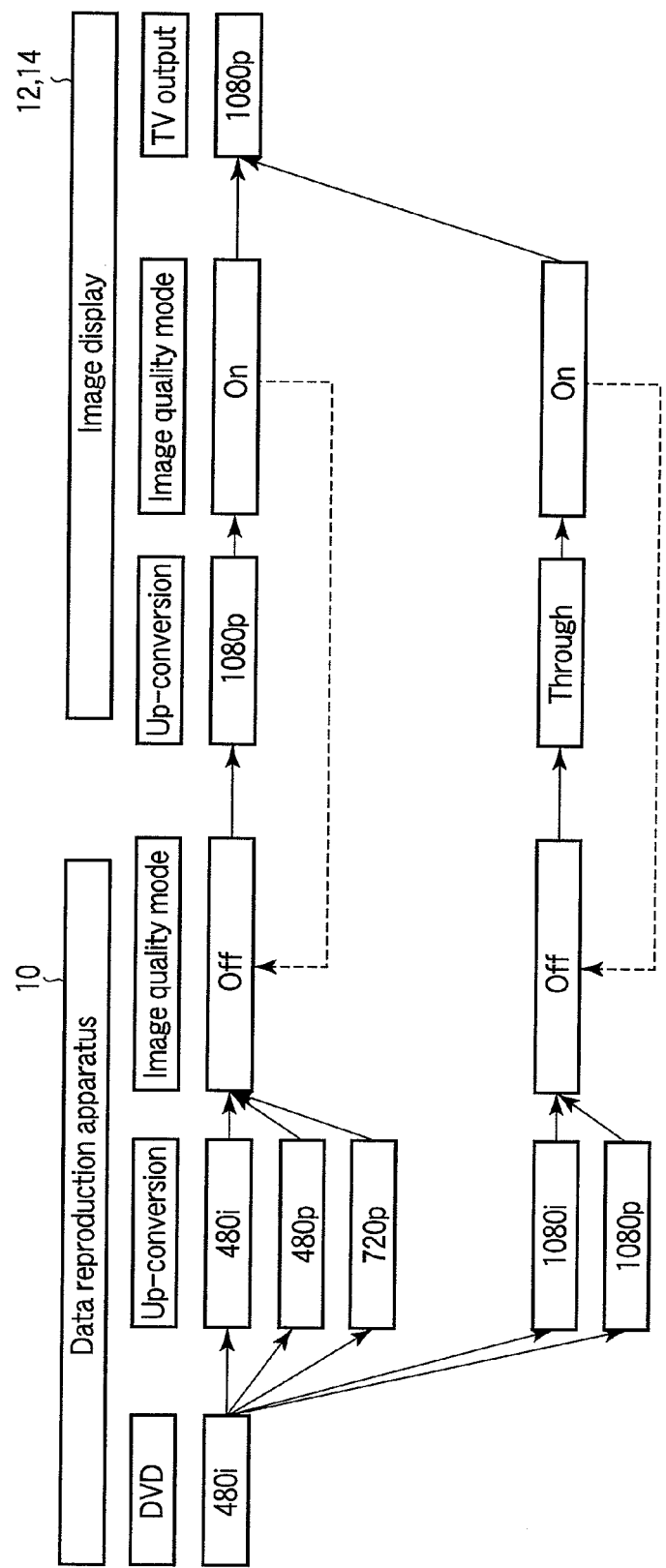
F I G. 21

DATA REPRODUCTION APPARATUS AND DATA REPRODUCTION CONTROL METHOD

CROSS-REFERENCE TO RELATED APPLICATIONS

This application is based upon and claims the benefit of priority from Japanese Patent Application No. 2008-205823, filed Aug. 8, 2008, the entire contents of which are incorporated herein by reference.

BACKGROUND

1. Field

One embodiment of the invention relates to a data reproduction apparatus and a data reproduction control method, both having the function of improving the quality of an image represented by reproduced image data.

2. Description of the Related Art

Of the conventional optical disk drives, some enable the users to switch the output resolution from one to another (see, for example, Jpn. Pat. Appln. KOKAI Publication No. 2007-150469, paragraphs [0011] to [0015], FIGS. 1 and 2). An optical disk drive of this type is connected to a monitor apparatus by a high-definition multimedia interface (HDMI) cable. Through the HDMI cable, digital video and audio signals are transmitted from the optical disk drive to the monitor apparatus. When the power switch of the optical disk drive is turned on, information, such as the specification of the monitor apparatus (e.g., information about various resolutions at which the monitor apparatus can display images), is transmitted from the monitor apparatus to the optical disk drive via the HDMI cable. The optical disk drive has the function of selecting any one of the resolutions at which the monitor apparatus can display images. This function is performed when the user operates a specific key (e.g., HDMI key) provided on the remote controller for used in combination with the monitor apparatus.

No restriction is imposed on the selection of resolution, as far as the resolutions at which the monitor apparatus can display images are concerned. Hence, a very high resolution can be selected from the resolutions available for the monitor apparatus. If the optical disk drive and/or the monitor apparatus have the function of improving the image quality, however, the monitor apparatus may display an image of low quality if an excessively high resolution is selected for the video data transmitted from the optical disk drive to the monitor apparatus.

Thus, the selection of resolution should better be restricted in some cases, in accordance with the image quality improvement function of the optical disk drive and/or the monitor apparatus. In the conventional data reproduction apparatuses, however, no restriction is imposed on the relationship between the settings of resolution and the image quality improvement function. Consequently, the image quality may be degraded, depending on the resolution selected.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary block diagram showing an exemplary configuration of a data reproduction apparatus according to an embodiment of the present invention.

FIGS. 4A, 4B and 4C are exemplary diagrams showing a setting menu, an image quality mode selection menu, and an output resolution selection menu, respectively, when the image quality mode is on.

FIGS. 5A, 5B and 5C are exemplary diagrams showing a setting menu, an output resolution selection menu, and an image quality mode selection menu, respectively, when output resolution of 1080 is selected.

FIGS. 6A, 6B and 6C are exemplary diagrams showing a setting menu, an output resolution selection menu, and an image quality mode selection menu, respectively, when output resolution other than 1080 is selected.

FIG. 7 is an exemplary table showing whether each of output resolutions can be set or not after the image quality mode has been set on or off.

FIG. 8 is an exemplary table showing whether image quality mode can be set or not for each of the output resolutions.

FIG. 9 is an exemplary table showing whether each of the output resolutions can be set or not with respect to D terminals after the image quality mode has been set.

FIG. 10 is an exemplary table showing whether the image quality mode can be set or not with respect to the D terminals after the output resolution has been set.

FIG. 11 is an exemplary diagram illustrating the concept of an image processing performed when an image mode is selected first, starting with the reproduction of data in a data reproduction apparatus and ending with the output of image data to an image display.

FIG. 12 is an exemplary diagram illustrating the concept of an image processing that is performed when an output resolution is selected first, starting with the reproduction of data by the data reproduction apparatus and ending with the output of image data to the image display.

FIG. 14 is an exemplary diagram illustrating the concept of an image processing sequence performed when the image mode process is turned on by the data reproduction apparatus, starting with the reproduction of data by the data reproduction apparatus and ending with the output of image data to an image display.

FIG. 15 is an exemplary diagram illustrating the concept of an image processing sequence performed when the image mode process is turned off by the data reproduction apparatus, starting with the reproduction of data by the data reproduction apparatus and ending with the output of image data to the image display.

FIG. 16 is another exemplary diagram illustrating the concept of another image processing sequence performed when the image mode process is turned on by the data reproduction apparatus, starting with the reproduction of data by the data reproduction apparatus and ending with the output of image data to the image display.

FIG. 17 is another exemplary diagram illustrating the concept of another image processing sequence performed when the image mode process is turned off by the data reproduction apparatus, starting with the reproduction of data by the data reproduction apparatus and ending with the output of image data to the image display.

FIG. 19 is an exemplary diagram illustrating the concept of an image processing sequence performed when the image mode process is turned on by the image display, starting with the reproduction of data by the data reproduction apparatus and ending with the output of image data to the image display.

FIG. 20 is an exemplary diagram illustrating the concept of an image processing sequence performed when the image mode process is turned off by the image display, starting with the reproduction of data by the data reproduction apparatus and ending with the output of image data to the image display.

FIG. 21 is another exemplary diagram illustrating the concept of another image processing sequence performed when the image mode process is turned on by the image display, starting with the reproduction of data by the data reproduction apparatus and ending with the output of image data to the image display.

DETAILED DESCRIPTION

Figure 2A:
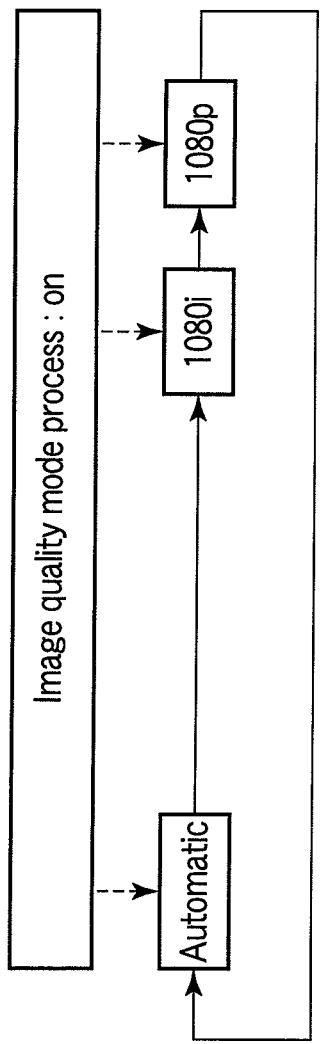
FIGS. 2A and 2B are exemplary diagrams illustrating an example of restriction imposed on the selection of an output resolution and an image quality mode.

Various embodiments according to the invention will be described hereinafter with reference to the accompanying drawings. In general, according to one embodiment of the invention, a data reproduction apparatus comprises a reproduction module configured to reproduce image data; a resolution selection module configured to select one of resolutions; an image quality mode selection module configured to select on or off state of an image quality mode; a selection disable module configured to disable the resolution selection module to select a prescribed resolution when the image quality mode selection module selects the on state of the image quality mode; and an image processor configured to improve a quality of the image data reproduced by the reproduction module in accordance with the resolution selected by the resolution selection module when the image quality mode selection module selects the on state of the image quality mode.

FIG. 1 is a diagram that shows a data reproduction apparatus 10 according to a first embodiment of the present invention. This embodiment is a DVD player. Nonetheless, the invention is not limited to a DVD player. Rather, the invention can be applied to an apparatus that can reproduce image data downloaded into a hard disk via a network such as the Internet. The data reproduction apparatus 10 is connected to image displays 12 and 14 such as TV receivers. The data reproduction apparatus 10 has a remote controller 16. The data reproduction apparatus 10 has a disk drive 20 in which an optical disk 18, such as a DVD, which is an example of a recording medium. The apparatus 10 may have a recording unit (not shown) for recording data in the optical disk 18, a turner (not shown) for receiving data to record, and a network interface (not shown) for downloading the data from the Internet. Thus, the embodiment can be a data recording apparatus. Moreover, the recording medium is not limited to an optical disk. It may be a hard disk or a flash memory.

The signal output from the disk drive 20 is supplied via an image processor 24 to the first input terminal of an adder 26. An on-screen display (OSD) 28 is provided, which generates menu images, etc., to be superposed on the image the disk drive 20 reproduces. The output of the on-screen display 28 is supplied to the second input terminal of the adder 26. Thus, the adder 26 generates image data representing an image superposed with menu images and the like. The output of the adder 26 is supplied through an HDMI terminal 30 to the image display 12, and through a D terminal 32 to the display 14.

The data reproduction apparatus 10 has a controller 40. The controller 40 receives a control signal from the remote controller 16. In the apparatus 10, the controller 40 receives the control signal via a remote control beam receiver 34. The data reproduction apparatus 10 has a user input device 36 such as a keyboard. The user may operate the user input device 36 to input signals. Any signal the user has input is supplied to the controller 40. An input signal coming from the user input device 36 includes a control signal generated at the remote controller 16. The controller 40 includes a setting menu display module 42, an image-quality selection menu creation module 44, an image quality mode preference, output resolution selection menu creation module 46, an output resolution selection menu creation module 48, and an output resolution preference, image quality mode selection menu creation module 50. The controller 40 further has a selected output resolution selection menu creation module 52, a selected image resolution mode setting module 54, a player preference, image quality mode command output module 56, and a TV preference, image quality mode command receiving module 58. The player preference, image quality mode command output module 56 and the TV preference, image quality mode command receiving module 58 can perform communication with the image display 12 via the vendor command line included in the HDMI cable. Nonetheless, the embodiment may not have the player preference, image quality mode command output module 56 or the TV preference, image quality mode command receiving module 58.

The image processor 24 performs a process to improve the image quality. This process is composed of an image quality improvement process and a resolution changing process. The image quality improvement process improves an image quality according to any one of three image quality modes. The three image quality modes include, for example, a sharpness mode, color mode and contrast mode. The sharpness mode is a process of emphasizing the edges of an image and is fit for displaying ordinary movies. The sharpness mode process (i.e., emphasis of image edges) is included in the two other modes. The color mode is a process of emphasizing green and blue in a color image, increasing the vividness of the color image and is therefore fit for presenting outdoor scenes. The contrast mode is a process of enhancing the contrast at the dark parts of an image and fit for displaying dark movie scenes. The image quality mode is switched from one to the next one, every time the image quality changing switch is pushed at the user input device 36. Thus, the sharpness mode, color mode and contrast mode are repeatedly selected as long as the user keeps pushing the image quality changing switch. While any one of the sharpness mode, color mode and contrast mode is selected, an image quality mode process is turned on.

In this embodiment, any one of the modes is selected in the image quality mode process. The operation of the embodiment may be simplified, nevertheless, to set only one image quality mode on or off. Further, in each image quality mode, the image quality may be improved to one of seven levels, i.e., level +7 to level −7. This method of improving the image quality is essentially equivalent to selecting one of 15 sharpness modes. The user may select one of these values in a menu screen after he or she has selected the image quality mode. The above-mentioned resolution changing process is a process of up-converting the resolution of the output image. The output resolutions at which the image can be output are 480p, 720p, 1080i, and 1080p. The resolution of the output image can be automatically changed in accordance with the resolution at which the image displays 12 and 14 display images. The resolution of the output image is changed to an automatic setting, 480p, 720p, 1080i, 1080p, an automatic setting, . . . one after another, each time when the resolution changing switch is pushed at the remote controller 16 or at the user input device 36. The automatic resolution changing will not be described since it is not directly related to this invention, and how to change the resolution automatically will not be explained. Note that the resolutions at which images can be output may include 1080p/24 (that is, 24 frames per second).

In the present embodiment, a prescribed restriction is imposed on the performing of the image quality process and on the selection of the output image resolution. This is because the image displays 12 and 14 may perform processes of improving the image quality (not only the processes identical to that of the image processor 24, but also similar processes). Hence, if both of the data reproduction apparatus 10 and image display 12 or 14 perform the image quality mode process, the edges of the image may be emphasized too much or the noise may become conspicuous, possibly degrading the image quality. In this embodiment, the image displays 12 and 14 can indeed perform an image quality improvement process (i.e., a combination of an image quality mode process and a process of up-conversion) if the resolution specified in the image signal is less than a predetermined value (e.g., 1080), i.e., 480p, 8720p. Nonetheless, they do not perform the image quality improvement process if the resolution specified in the image signal is 1080 or more.

Therefore, if the image quality mode process is on by the data reproduction apparatus 10 as shown in FIG. 2A (thus selecting the sharpness, color and contrast modes), neither the resolution of 480p nor the resolution of 720p can be selected for the output image, inhibiting the image displays 12 and 14 from performing the an image quality improvement process. That is, as the user repeatedly pushes the resolution changing switch, the automatic resolution changing, the selection of 1080i, and the selection of 1080p are repeated in the order mentioned.

Figure 2B:
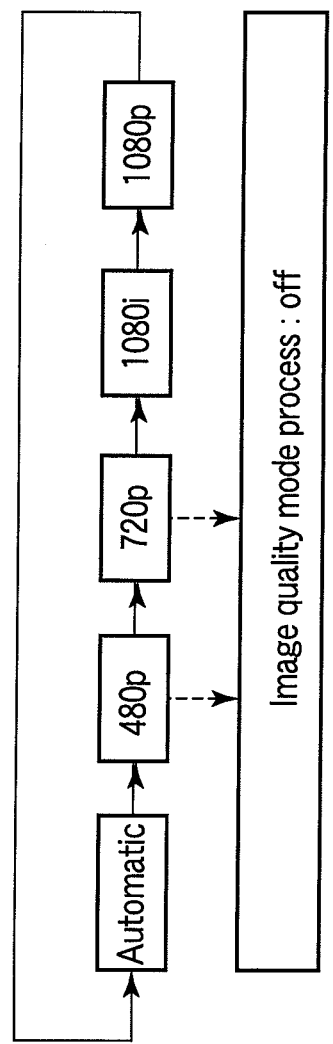

If the resolution of 480p or the resolution of 720p is selected for the output image as shown in FIG. 2B, the image quality mode is fixed to be off by the data reproduction apparatus 10 so that the image quality is not degraded even if the image displays 12 and 14 perform an image quality improvement process. Therefore, the image quality mode process cannot be rendered on.

If the resolution of 480p or the resolution of 720p is selected, no matter how as shown in FIG. 2A or FIG. 2B, the image quality mode process is turned off by the data reproduction apparatus 10. This prevents both the data reproduction apparatus 10 and the image displays 12 and 14 from performing the image quality mode process at the same time.

Figures 3A, 3B, 3C:
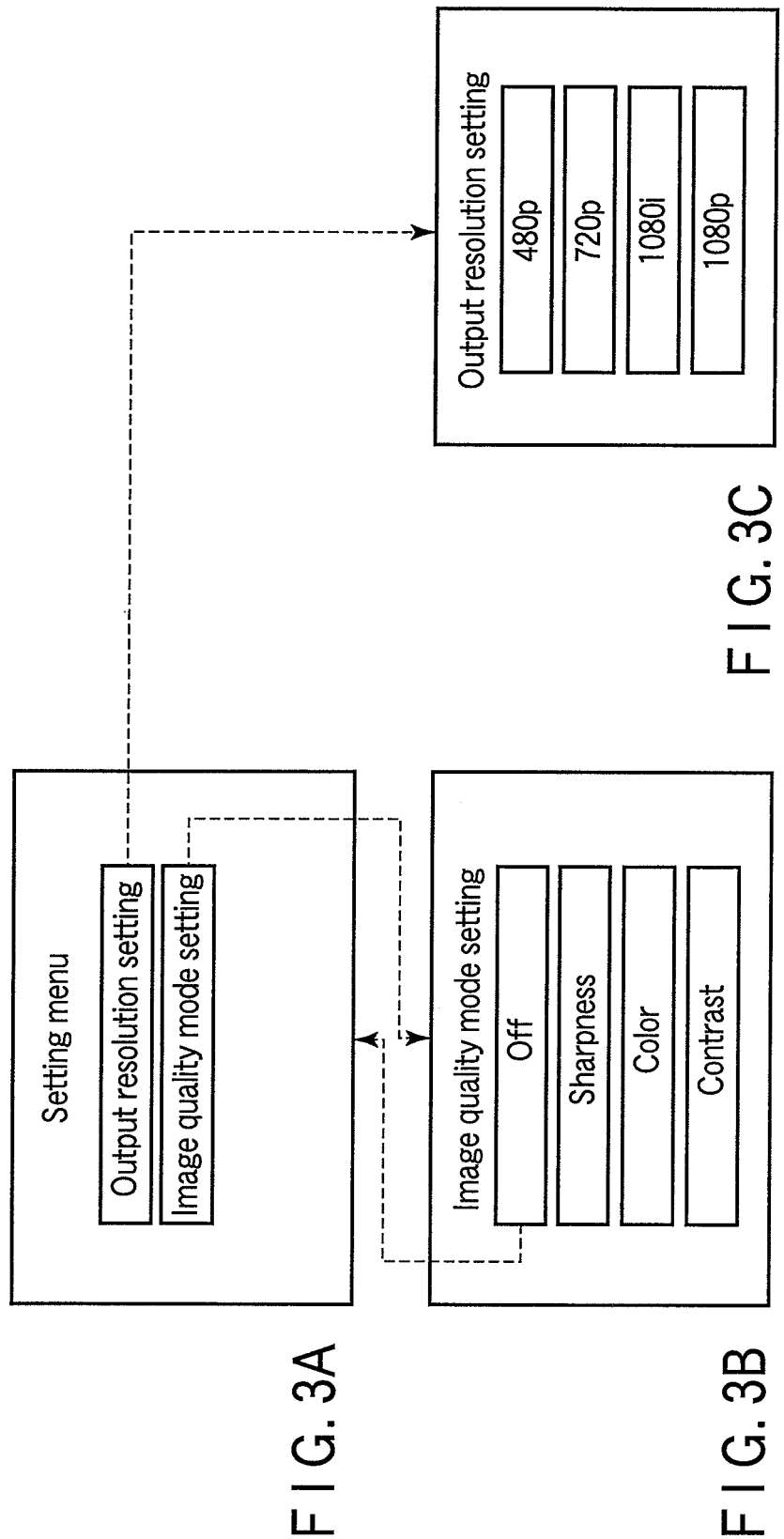
FIGS. 3A, 3B and 3C are exemplary diagrams showing a setting menu, an image quality mode selection menu, and an output resolution selection menu, respectively, when the image quality mode is off.

FIGS. 3A, 3B and 3C show how an output resolution is selected when the image quality mode process is turned off. FIGS. 3A, 3B and 3C show a setting menu, an image quality mode setting menu, and an output resolution setting menu, respectively. As shown in FIG. 3A, two choices (buttons) are displayed in the setting menu for the image processor 24, one choice being the output resolution setting and the other choice being the image quality mode setting. If the image quality mode setting is selected and if this selection is determined (or "selected" as will be expressed hereinafter), an image quality mode setting menu is displayed as shown in FIG. 3B. In the image quality mode setting menu, four choices are displayed, which are off, sharpness, color and contrast. If off is selected, the menu is changed back to the setting menu of FIG. 3A. If the output resolution setting is selected in the menu of FIG. 3A, the output resolution setting menu is displayed as shown in FIG. 3C. In the output resolution setting menu, four choices (buttons) are displayed, which are 480p, 720p, 1080i and 1080p. Thus, any one of all output resolutions available can be selected if the image quality mode process is off.

FIGS. 4A, 4B and 4C show how an output resolution is selected when the image quality mode process is turned on. FIGS. 4A, 4B and 4C show a setting menu, an image quality mode setting menu, and an output resolution setting menu, respectively. As shown in FIG. 4A, two choices are displayed in the setting menu for the image processor 24, one choice being the output resolution setting and the other choice being the image quality mode setting. If the image quality mode setting is selected, an image quality mode setting menu is displayed as shown in FIG. 4B. In the image quality mode setting menu, four choices are displayed, which are off, sharpness, color and contrast. If any one of the sharpness, color and contrast is selected (thus, setting the image quality mode process on), the menu is changed back to the setting menu of FIG. 4A. If the output resolution setting is selected in the menu of FIG. 4A, the output resolution setting menu is displayed as shown in FIG. 4C. In contrast to FIG. 3C, in the output resolution setting menu of FIG. 4C, only two choices are displayed, which are 1080i and 1080p. The interface is so changed that neither 480p nor 720p are displayed, or 480p and 720p are displayed but in low density, disabling the user to select 480p or 720p. This prevents both the data reproduction apparatus 10 and the image displays 12 and 14 from performing the image quality mode process at the same time.

FIGS. 5A, 5B and 5C show how an image quality mode is selected when the output resolution of 1080i or 1080p is selected. FIGS. 5A, 5B and 5C show a setting menu, an output resolution setting menu, and an image quality mode setting menu, respectively. As shown in FIG. 5A, two choices are displayed in the setting menu for the image processor 24, one choice being the output resolution setting and the other choice being the image quality mode setting. If the output resolution setting is selected, the output resolution setting menu is displayed as shown in FIG. 5B. In the output resolution setting menu, four choices are displayed, which are 480p, 720p, 1080i and 1080p. If 1080i or 1080p is selected, the menu is changed back to the setting menu of FIG. 5A. If the image quality mode setting is selected at this point, the image quality setting menu is displayed as shown in FIG. 5C. In the image quality setting menu, four choices (buttons) are displayed, which are off, sharpness, color and contrast. In this case, no restriction is imposed on the selection of the image quality mode process.

FIGS. 6A, 6B and 6C show an image quality mode is selected when the output resolution of 480p or 720p is selected. FIGS. 6A, 6B and 6C show a setting menu, an output resolution setting menu, and an image quality mode setting menu, respectively. As shown in FIG. 6A, two choices are displayed in the setting menu for the image processor 24, one choice being the output resolution setting and the other choice being the image quality mode setting. If the output resolution setting is selected, the output resolution setting menu is displayed as shown in FIG. 6B. In the output resolution setting menu, four choices (buttons) are displayed, which are 480p, 720p, 1080i and 1080p. If 480p or 720p is selected, the menu is changed back to the setting menu of FIG. 6A. If the image quality mode setting is selected at this point, the image quality setting menu is displayed as shown in FIG. 6C. In contrast to the menu of FIG. 5C, in the image quality setting menu, the four choices, i.e., off, sharpness, color and contrast, are concealed by a message of "No image quality modes can be selected (Image quality mode is off)." Thus, no image quality modes can be selected (that is, the image quality mode process is fixed off) if the output resolution of the data reproduction apparatus 10 is lower than 1080 which is a condition of the image display device 12 or 14 to perform the image quality mode process. This prevents both the data reproduction apparatus 10 and the image display 12 or 14 from performing the image quality mode process at the same time.

FIG. 7 shows whether an output resolution can be set after the image quality mode has been set on or off. As seen from FIG. 7, any one of the four output resolutions, i.e., 480p, 720p, 1080i and 1080p, can be selected if the image quality mode is off. If the image quality mode is on, either 1080i o 1080p can be selected as the output resolution, but neither 480p nor 720p can be selected as the output resolution.

FIG. 8 shows whether image quality mode can be set in accordance with which output resolution has been set. As seen from FIG. 8, the image quality mode process cannot be on (the process is fixed off) if 480p or 720p is selected as the output resolution. If 1080i or 1080p is selected as the output resolution, the image quality mode process can be set on (and, of course, off).

The output resolution accords with the type of D terminal. FIG. 9 shows whether the output resolution can be set after the image quality mode has been set on or off, in accordance with whether the D terminal has been set or not. As seen from FIG. 9, any type of D terminal can be selected if the image quality mode process is off. If the image quality mode process is on, the D3 terminal can be selected. The output resolution can be 1080i at most, but assume that the D3 terminal is selected if the output resolution is 1080i, this assumption applied hereinafter. Alternatively, the D5 terminal (1080p) can be selected, but the D1 terminal (480i), the D2 terminal (480p) and the D4 terminal (720p) cannot be selected.

FIG. 10 is a table showing whether the image quality mode can be set after the output resolution has been set, in accordance with whether the D terminal has been set or not. If the D1 terminal (480i), the D2 terminal (480p), or the D4 terminal (720p) is selected, the image quality mode process cannot be on. The image quality mode process can be on if the D3 terminal (1080i) or the D5 terminal (1080p) is selected.

FIG. 11 illustrates the concept of an image processing performed if an image mode is selected first, starting with the reproduction of data by the data reproduction apparatus 10 and ending with the output of image data to the image display 12 or 14. Assume that image data is reproduced from the DVD 18 at the resolution of 480i, and that the image display 12 or 14 outputs image data at the resolution of 1080p. If the image quality mode process is on by the data reproduction apparatus 10, only 1080i or 1080p can be selected as the output resolution. Therefore, neither the image display 12 nor the image display 14 performs an image quality improvement process. Hence, the image display 12 or 14 fixes the resolution in the resolution changing process (up-conversion). That is, the image display 12 or 14 performs a through process. The image quality mode process is turned off, too.

The output resolution of 480p or 720p may be selected while the image quality mode process is off by the data reproduction apparatus 10. In this case, the apparatus 12 or 14 performs the image quality improvement process. In the apparatus 12 or 14, the resolution changing process is performed, up-converting the resolution to 1080p, and the image quality mode process is turned on, too.

FIG. 12 illustrates the concept of an image processing, too, starting with the reproduction of data by the data reproduction apparatus 10 and ending with the output of image data to the image display 12 or 14. Note that the image mode is selected first in the case of FIG. 11, whereas in the case of FIG. 12 the output resolution is selected first. If 480p or 720p is selected as the output resolution for the data reproduction apparatus 10, the image quality mode process will be turned off. Since the output resolution of the data reproduction apparatus 10 is 480p or 720p, the image display 12 or 14 performs the image quality improvement process. That is, in the image display 12 or 14, the resolution is up-converted to 1080p in the resolution changing process, and the image quality mode process is turned on. If 1080p or 1080i is selected as the output resolution for the data reproduction apparatus 10, the image quality mode process is turned on. In this case, since the output resolution of the data reproduction apparatus 10 is 1080i or 1080p, neither the image display 12 nor the image display 14 performs the image quality improvement process. Therefore, in the image display 12 or 14, the resolution is fixed (through process) in the resolution changing process (up-conversion), and the image quality mode process is turned off.

How the data reproduction apparatus 10 operates alone has been explained thus far. As long as the apparatus 10 operates alone, its output resolution can be freely selected, no matter how the image quality improvement process precedes in the image display 12 or 14. Combinations of choices are limited, nevertheless. In other words, the menu displayed on the apparatus 10 includes the choices that cannot be selected.

Hereinafter, it will be explained how the data reproduction apparatus 10 detects the image quality improvement process setting in the image display 12 or 14 and how the apparatus 10 changes the mode of selection in accordance with the image quality improvement process setting of the image display 12 or 14. For the apparatus 10 to make these changes, the player preference, image quality mode command output module 56 and the TV preference, image quality mode command receiving module 58, both shown in FIG. 1, are dispensable. If the player is preferential, the player preference, image quality mode command output module 56 outputs an image quality mode command representing the image quality mode set by the apparatus 10, to the image display 12 or 14. If the TV receiver is preferential, the TV preference, image quality mode command receiving module 58 receives, from the image display 12 or 14, the image quality mode command set by the apparatus 12 or 14 and output from the apparatus 12 or 14 to the data reproduction apparatus 10. The two commands are transmitted through the vendor command line included in the HDMI cable.

FIGS. 13A, 13B, 13C and 13D show a setting menu, an image quality mode setting menu, an image quality mode setting menu, and an output resolution setting menu, respectively, which are displayed when the player preferential, image quality mode is selected. If the player is preferential, the image quality mode can be freely set by the player (i.e., data reproduction apparatus 10). Once the setting data about the player has been transmitted to the TV receiver (i.e., image display 12 or 14), however, the setting data restricts the setting of image quality mode is restricted in the TV receiver.

Figure 13A:
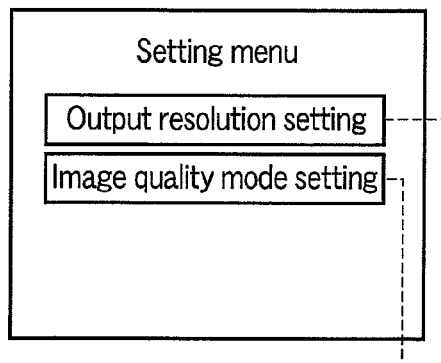
FIGS. 13A, 13B, 13C and 13D are exemplary diagrams showing a setting menu, an image quality mode selection menu, an image quality mode selection menu, and an output resolution selection menu, respectively, which are displayed when the player preferential, image quality mode is selected.
Figure 13B:
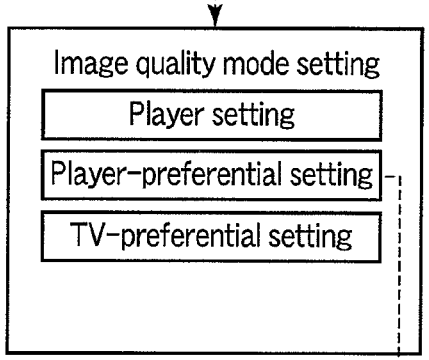
Figure 13C:
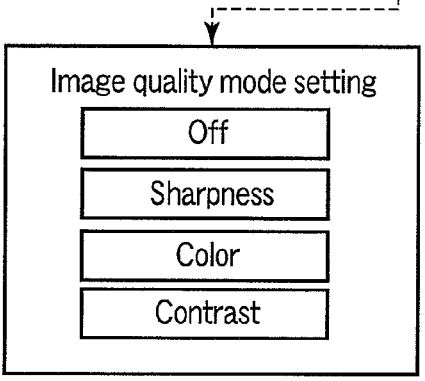
Figure 13D:
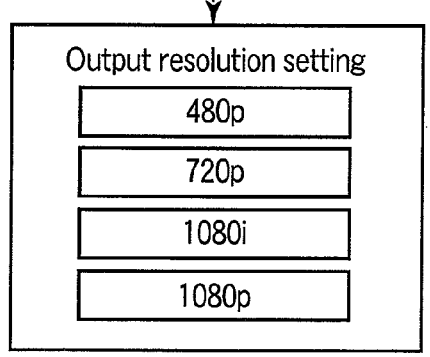

As shown in FIG. 13A, two choices are displayed in the setting menu for the image processor 24, one choice being the output resolution setting and the other choice being the image quality mode setting. If the image quality mode setting is selected, an image quality mode setting menu is displayed as shown in FIG. 13B. In the image quality mode setting menu, three choices are displayed, which are player setting, player-preferential setting, and TV-preferential setting. If the player-preferential setting is selected, an image quality mode setting menu is displayed as shown in FIG. 13C. Now that the player-preferential setting has been selected, the image quality mode setting menu displays four choices, which are off, sharpness, color and contrast. Thus, no limitation is imposed on the image quality mode selection. When any one of the four choices is selected, the menu is switched back to the setting menu of FIG. 13A. When the output resolution setting is selected in the setting menu of FIG. 13A, an output resolution setting menu is displayed as shown in FIG. 13D. The output resolution setting menu shows four choices, which are 480p, 720p, 1080i and 1080p. In the setting menu of FIG. 13A, the image quality mode setting and the output resolution setting may be selected in the order mentioned, or in the order opposite to the order mentioned.

FIG. 14 illustrates the concept of an image processing sequence performed when the image mode process is turned on by the data reproduction apparatus 10, starting with the reproduction of data in the data reproduction apparatus 10 and ending with the output of image data to the image display 12 or 14. The setting data about the image quality mode process of the data reproduction apparatus 10 is transmitted to the image display 12 or 14, as the vendor command of the HDMI cable. The setting data thus transmitted turns the image quality mode process on or off by the image display 12 or 14. More precisely, the image quality mode process will be turned off by the image display 12 or 14 if the image quality mode process is turned on by the image display 12 or 14, and the image quality mode of the image display 12 or 14 can be turned on if the image quality mode process is turned off by the image display 12 or 14. When the output resolution of 480p or 720p may be selected by the image display 12 or 14, in the TV receiver, the resolution changing process is performed to up-convert the resolution to 1080p, and the image quality mode process is turned off. If the output resolution of 1080i or 1080p is selected by the data reproduction apparatus 10 layer, the image display 12 or 14 fixes the resolution in the resolution changing process (up-conversion). That is, the image display 12 or 14 performs a through process. The image quality mode process is turned off.

FIG. 15 illustrates the concept of an image processing sequence performed when the image mode process is turned off by the data reproduction apparatus 10, starting with the reproduction of data by the data reproduction apparatus 10 and ending with the output of image data to the image display 12 or 14. The image processing sequence of FIG. 15 differs from the image processing sequence of FIG. 14, in respect of turning on or off the image quality mode process. The sequence of FIG. 15 is identical to that of FIG. 14 in terms of up-conversion.

FIGS. 16 and 17 illustrate the concept of another image processing sequence of the image data transmitted from the data reproduction apparatus 10 to the image display 12 or 14. FIGS. 16 and 17 differ from FIGS. 14 and 15, respectively, only in that the output resolution setting is selected first, not the image mode setting as in the case of FIGS. 14 and 15.

FIGS. 18A, 18B, 18C, 18D and 18E show a setting menu, an image quality mode selection menu, another image quality mode selection menu, still another image quality mode selection menu, and an output resolution selection menu, respectively, which are displayed when the TV preferential, image quality mode is selected. In the TV preferential, image quality mode, the image quality mode can be freely set by the image display 12 or 14. The setting data about the image display 12 or 14 is transmitted to the data reproduction apparatus 10. The data reproduction apparatus 10 restricts the setting of the image quality mode process thereof, in accordance with the setting data.

Figure 18A:
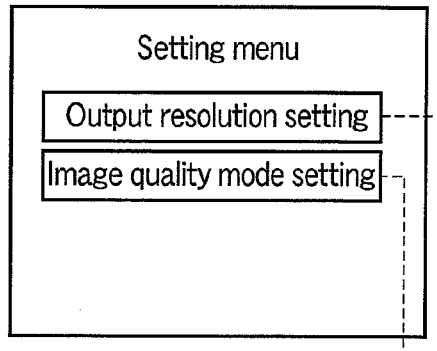
FIGS. 18A, 18B, 18C, 18D and 18E are exemplary diagrams showing a setting menu, an image quality mode selection menu, another image quality mode selection menu, still another image quality mode selection menu, and an output resolution selection menu, respectively, which are displayed when the TV preferential, image quality mode is selected.
Figure 18B:
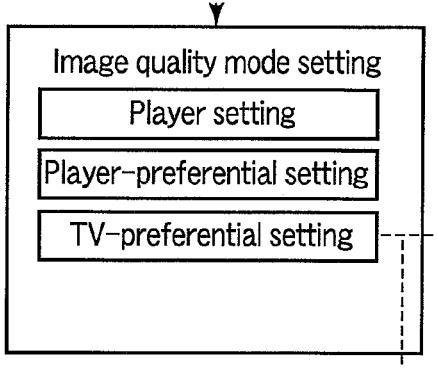

As shown in FIG. 18A, two choices are displayed in the setting menu for the image processor 24, one choice being the output resolution setting and the other choice being the image quality mode setting. If the image quality mode setting is selected, the image quality mode setting menu will be displayed as shown in FIG. 18B. In the image quality mode setting menu, three choices are displayed, which are player setting, player-preferential setting, and TV-preferential setting, as shown in FIG. 18B. If the TV-preferential setting is selected, one of two menus will be displayed, in accordance with whether the image quality mode process is turned on or off by the image display 12 or 14.

Figure 18E:
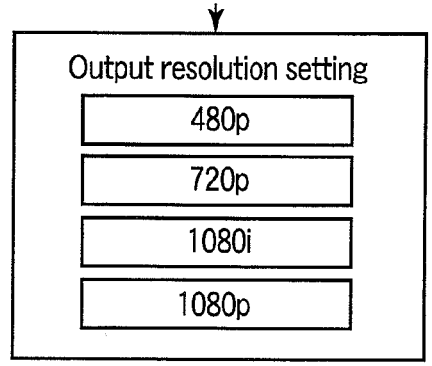
Figure 18C:
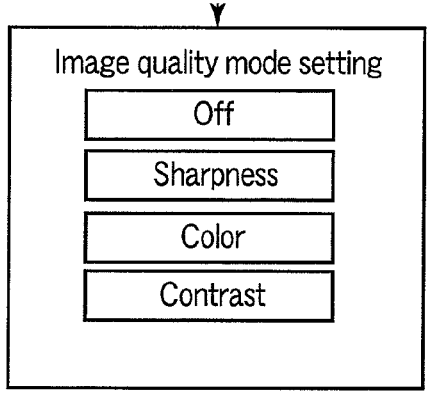
Figure 18D:
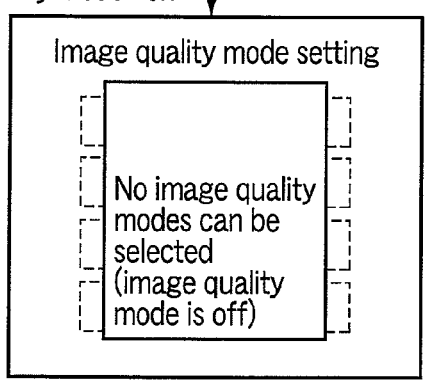

If the image quality mode process is turned off by the image display 12 or 14, an image quality mode setting menu will be displayed as shown in FIG. 18C. The image quality mode setting menu includes four choices, which are off, sharpness, color and contrast. Since the image quality mode process is off by the image display 12 or 14, the image quality mode can be freely set by the data reproduction apparatus 10. When any one of the image quality modes is selected, the menu is switched back to the setting menu of FIG. 18A. If the image quality mode process is turned on by the image display 12 or 14, the image quality setting menu is displayed as shown in FIG. 18D. In the image quality setting menu of FIG. 18D, the four choices, i.e., off, sharpness, color and contrast, are concealed by a message of "No image quality modes can be selected (Image quality mode is off)." Thereafter, a decision may be made. Then, the menu is switched back to the setting menu of FIG. 18A.

If the output resolution setting is selected in the setting menu of FIG. 18A, an output resolution setting menu is displayed as shown in FIG. 18E. The output resolution setting menu includes four choices, which are 480p, 720p, 1080i and 1080p. In the setting menu of FIG. 18A, the image quality mode setting and the output resolution setting may be selected in the order mentioned, or in the order opposite to the order mentioned.

FIG. 19 illustrates the concept of an image processing sequence performed when the image mode process is turned on by a TV receiver, starting with the reproduction of data by the data reproduction apparatus 10 and ending with the output of image data to the image display 12 or 14. The setting data about the image quality mode process of the TV receiver is transmitted to the player, as the vendor command of the HDMI cable. The setting data thus transmitted turns the image quality mode process on or off by the player. More precisely, the image quality mode process will be turned off by the player if the image quality mode process is turned on by the TV receiver, and the image quality mode of the player can be turned on if the image quality mode process is turned off in the TV receiver. The output resolution of 480p or 720p may be selected by the player. In this case, in the TV receiver, the resolution changing process is performed, up-converting the resolution to 1080p, and the image quality mode process is turned on. If the output resolution of 1080i or 1080p is selected by the player, the resolution changing process (up-conversion) is performed, while not changing (fixing) the resolution in the resolution changing process (thus, achieving through process), and the image quality mode process is turned on.

FIG. 20 illustrates the concept of an image processing sequence performed when the image mode process is turned off by the image display 12 or 14, starting with the reproduction of data by the data reproduction apparatus 10 and ending with the output of image data to the image display 12 or 14. If the image quality mode process is turned off by the image display 12 or 14, the image quality mode process can be turned on by the data reproduction apparatus 10. If 480p or 720p is selected as the output resolution by the data reproduction apparatus 10, the image display 12 or 14 performs the resolution changing process, up-converting the resolution to 1080p, and the image quality mode process is turned on. If 1080i or 1080p is selected as the output resolution by the data reproduction apparatus 10, the resolution changing process (up-conversion) is performed by the image display 12 or 14, fixing the resolution (achieving through process) in the resolution changing process (up-conversion), and the image quality mode process is turned on.

Figure 22:
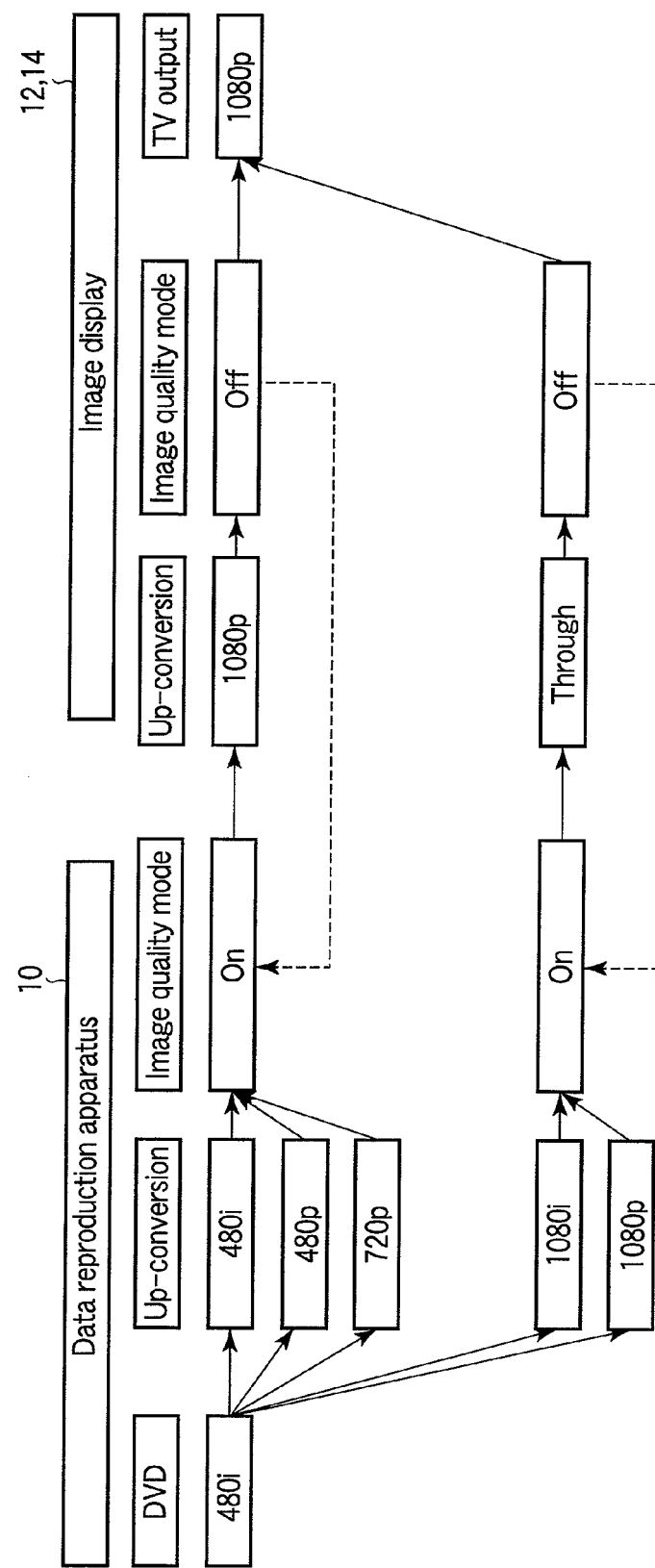
FIG. 22 is another exemplary diagram illustrating the concept of another image processing sequence performed when the image mode process is turned off by the image display, starting with the reproduction of data by the data reproduction apparatus and ending with the output of image data to the image display.

FIGS. 21 and 22 illustrate the concept of another image processing sequence starting with the reproduction of data by the image reproduction apparatus 10 and ending with the output of image data to the image display 12 or 14. FIGS. 21 and 22 differ from FIGS. 19 and 20, respectively, only in that the output resolution setting is selected first, not the image mode setting as in the case of FIGS. 19 and 20.

Figure 23:
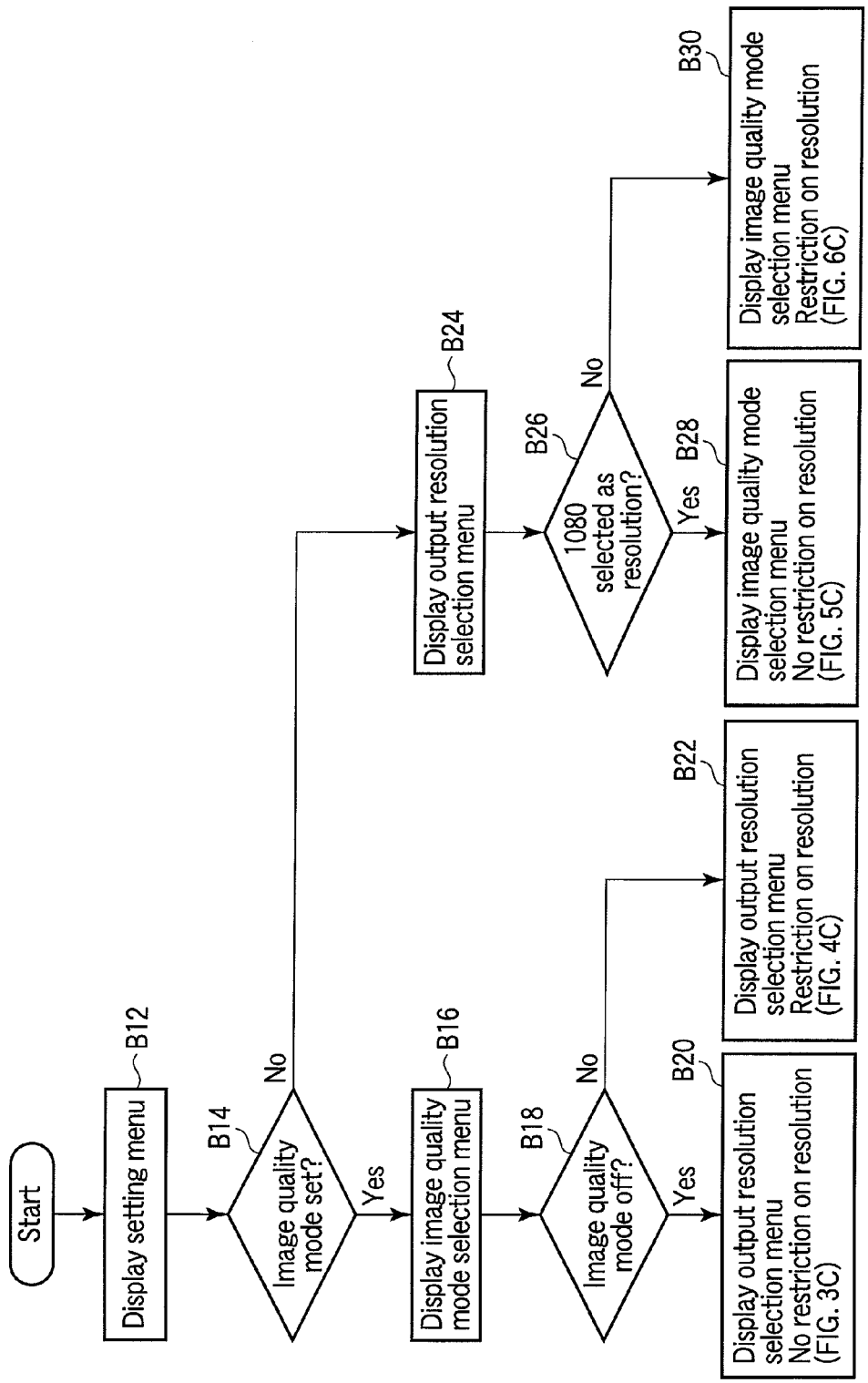
FIG. 23 is an exemplary flowchart explaining how the controller 40 operates to display the menus of FIGS. 3A to 12 while the data reproduction apparatus is operating alone.

FIG. 23 is a flowchart explaining how the controller 40 operates to display the menus of FIGS. 3A to 12 while the player is operating alone.

First, in Block B12, a setting menu (e.g., menu shown in FIG. 3A) is displayed.

In Block B14, it is determined whether the image quality mode setting has been selected in the setting menu. If the image quality mode setting has been selected, the process goes to Block B16. In Block B16, an image quality mode setting menu (e.g., menu of FIG. 3B) is displayed.

In Block B18, it is determined whether the image quality mode has been turned off. If the image quality mode has been turned off, a menu showing choices that can be selected with no restriction (e.g., menu of FIG. 3C) is displayed in Block B20. If the image quality mode is turned on (thus, selecting sharpness, color or contrast), the process goes to Block B22. In Block B22, an output resolution setting menu (e.g., menu of FIG. 4C) is displayed. The setting menu showing all four choices is displayed in Block B20, and the setting menu, from which 1080i and 1080p can be selected, but 480p or 720p cannot, is displayed in Block B22.

If the image quality mode setting is selected in Block B14, an output resolution setting menu (e.g., menu of FIG. 5B) is displayed in Block B24.

Then, in Block B26 it is determined whether the output resolution of 1080i or 1080p has been selected. If the output resolution of 1080i or 1080p has been selected, an image quality mode setting menu (e.g., menu of FIG. 5C) is displayed, in which no restriction is imposed on the selection of an image quality mode in block B28. If any output resolution other than 1080i and 1080p, the process goes to Block B30. In Block B30, an image quality mode setting menu (e.g., menu of FIG. 6C) is displayed, in which restriction is imposed on at least one part of the selection of an image quality mode. The setting menu showing all four choices is displayed in Block B28, and the setting menu showing that no image quality modes can be selected (any image quality mode is off) is displayed in Block B30.

Figure 24:
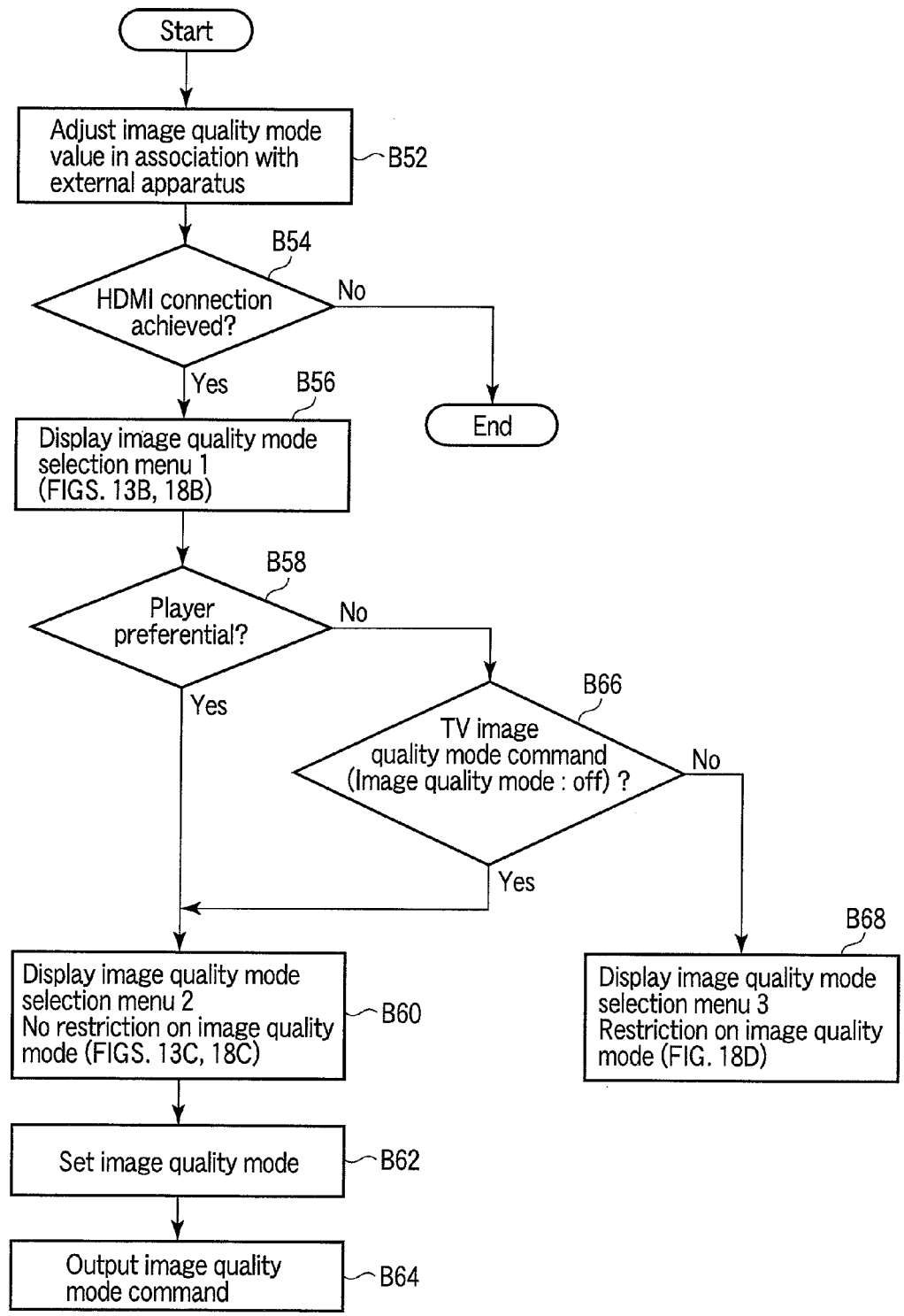
FIG. 24 is an exemplary flowchart explaining how the controller 40 operates to display menus when the player-preferential or the TV-preferential image mode is set as shown in FIG. 13A to 22.

FIG. 24 is a flowchart explaining how the controller 40 of the data reproduction apparatus 10 operates to display menus while the data reproduction apparatus or the image display is preferentially being operated as shown in FIGS. 13A to 22.

In Block B52, a process of cooperation of the external apparatus (e.g., image display 12) and the data reproduction apparatus 10 to adjust the image quality mode is started. More specifically, the external apparatus is connected to the data reproduction apparatus 10, by using the HDMI cable. Then, in Block B54, it is determined whether the HDMI authentication has been accomplished. If the HDMI authentication has not been accomplished, the process is terminated.

If the HDMI authentication has been accomplished, the setting menu is displayed in Block B56. The user may select the image quality setting. In this case, an image quality mode setting menu 1 (e.g., the menu of FIG. 13B or the menu of FIG. 18B) is displayed, which shows three choices, i.e., player setting, player-preferential setting, and TV-preferential setting. In Block B58, it is determined whether the player-preferential setting has been selected. If the TV-preferential setting has been selected, the process goes to Block B66. In Block B66, it is determined whether the image quality mode command transmitted from the image display to the image quality mode command receiving module 58 is off. If the image quality mode command is on, an image quality mode setting menu 3 (e.g., menu of FIG. 18D) is displayed in Block B68, showing that no image quality modes can be selected by the data reproduction apparatus is displayed. When the turn off of the image quality mode command is determined, the menu is switched back to the setting menu. Any output resolution displayed in this menu is then selected, if necessary.

If the image quality mode command transmitted from the image display is off in Block 66, the process goes to Block B60. In Block 60, an image quality mode setting menu 2 (i.e., menu of FIG. 18C) is displayed, showing that no restriction is imposed on the selection of an image quality mode for the data reproduction apparatus.

If the player-preferential setting is selected in Block B58 the process goes to Block B60. In Block 60, an image quality setting menu 2 (i.e., menu of FIG. 13C) is displayed, showing that no restriction is imposed on the selection of an image quality mode for the data reproduction apparatus.

Then, in Block 62, an image quality mode, i.e., off, sharpness, color or contrast, is selected. In Block 64, the image quality mode command output module 56 outputs an image quality mode command representing the image quality mode selected to the image display. When the image quality mode of the image display is turned off, the menu is switched back to the setting menu. Any output resolution displayed in this menu is then selected, if necessary.

As described above, in the data reproduction apparatus according to this embodiment, which has the function of changing the image quality, any resolution equal to or lower than a prescribed value cannot be set as long as the apparatus remain in a preset image mode. Hence, the data reproduction apparatus and the external apparatus (the image display) never perform the image quality mode changing function at the same time. This prevents the image quality from degrading. Moreover, this renders it unnecessary to take any measures against possible image quality degradation, when he or she input various setting items. The data reproduction apparatus can therefore always reproduce images of optimal quality.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The various modules of the systems described herein can be implemented as software applications, hardware and/or software modules, or components on one or more computers, such as servers. While the various modules are illustrated separately, they may share some or all of the same underlying logic or code. The accompanying claims and their equivalents are intended to cover such forms or modifications as would fall within the scope and spirit of the inventions.

The process of cooperating the image quality modes of the data reproduction apparatus and the image display, which has been explained with reference to FIG. 13A to FIG. 22, is concerned with the case where the image quality mode is only on or off. Nonetheless, if the image quality mode can be set with a variable value, the set value of image quality mode of the data reproduction apparatus can be controlled based on the set value of image quality mode of the image display. The "set value of image quality mode" is the degree by which to improve the image quality, which the user has set. In the sharpness mode, for example, the degree of emphasizing the image edges may be varied in a range of +7 to −7. If any mode is selected in the image quality mode setting menu, e.g., menu of FIG. 3B, the menu will not be immediately switched back to the image quality mode setting menu, e.g., menu of FIG. 3A. Rather, a set value setting menu may be displayed, enabling the user to select and input a value. Further, if the value to select and input is limited, the image quality mode can be turned on in both the data reproduction apparatus and the image display. For instance, if the value set for the image quality mode of the image display is large, the value set for the image quality mode of the data reproduction apparatus may be reduced. If the value of image quality mode, set for the data reproduction apparatus or the image display, is maximal, this state is considered equivalent to the image quality mode turned on as described above. If the image quality mode of the image display is not identical to that of the data reproduction apparatus, it is sufficient to perform a cooperative control for similar image quality modes. Assume that a cinema mode and a sport mode are available as image quality modes for the image display. Then, the data reproduction apparatus and the image display are controlled in terms of image quality mode value, such that the more the image quality is improved in the data display, the less the image quality is improved in the data reproduction apparatus. For example, if the sport mode is selected by the image display, the image quality mode will be turned off or set to a small value by the data reproduction apparatus. If the cinema mode is selected by the image display, the image quality mode will be turned on or set to a larger value by the data reproduction apparatus.

In the process of cooperative controlling the image quality mode value in both the data reproduction apparatus and the image display as explained with reference to FIG. 13A to FIG. 22, the image quality mode commands that indicate the image quality modes set by the data reproduction apparatus and the image display, respectively, are not limited to those of the HDMI standard. That is, an HDMI-CEC cable or a digital video interface (DVI) cable may connect the data reproduction apparatus and the image display, so that data communication may be achieved between the data reproduction apparatus and the image display. Digital video interface CEA-861E can serve to transmit image quality mode commands, by using information such as InfoPacket or InfoFrame. Further, this invention can enable computers to operate specific means, to function as particular means, or to perform prescribed functions. Alternatively, this invention can be embodied as a computer-readable recording medium that stores programs.

According to the present invention, any image quality mode or any resolution that may degrade the image quality cannot be set, as has been described. The user can therefore have images reproduced at optimal quality, without the necessity of taking measures against possible image quality degradation when he or she input various setting items.

What is claimed is:

1. A data playback apparatus comprising:
a playback module configured to play image data;
a resolution selection module configured to select a resolution among resolutions;
an image quality mode selection module configured to select either on or off state of an image quality mode;
a selection disable module configured to disable the resolution selection module to select a first resolution among the resolutions as well as to enable the resolution selection module to select remaining resolutions among the resolutions when the image quality mode selection module selects the on state of the image quality mode; and
an image processor configured to improve a quality of the image data played by the playback module in accordance with the resolution selected by the resolution selection module when the image quality mode selection module selects the on state of the image quality mode.

2. The apparatus of claim 1, wherein the selection disable module is configured to disable the resolution selection module to select a resolution lower than the predetermined first resolution.

3. The apparatus of claim 2, wherein the image quality mode selection module is configured to select an image quality mode when the image quality mode selection module selects the on state of the image quality mode.

4. The apparatus of claim 1, wherein the apparatus is configured to connect to an external apparatus comprising an image quality improvement function by a communication module, and which further comprising:
a detection module configured to detect a setting state of the image quality improvement function of the external apparatus, via the communication module; and
a restriction module configured to restrict an operation of the image quality mode selection module in accordance with the setting state detected by the detection module.

5. The apparatus of claim 4, wherein the restriction module is configured to disable the image quality mode selection module to select the on state of the image quality mode when the image quality improvement function of the external apparatus is set to an on state.

6. A data playback apparatus comprising:
a playback module configured to play image data;
a resolution selection module configured to select a resolution among resolutions;
an image quality mode selection module configured to select either on or off state of an image quality mode;

a selection disable module configured to disable the image quality mode selection module to select the on state of the image quality mode when the resolution selection module selects a first resolution; and an image processor configured to improve a quality of the image data played by the playback module in accordance with the resolution selected by the resolution selection module when the image quality mode selection module selects the on state of the image quality mode.

7. The apparatus of claim 6, wherein the selection disable module is configured to disable the image quality mode selection module to select the on state of the image quality mode when the resolution selection module selects a resolution lower than the first resolution.

8. The apparatus of claim 7, wherein the image quality mode selection module is configured to select an image quality mode when the image quality mode selection module selects the on state of the image quality mode.

9. A data playback control method for use in a data playback apparatus comprising:
 playing image data;
 selecting a resolution among resolutions;
 selecting either on or off state of an image quality mode;
 improving a quality of the image data to be played when the on state of the image quality mode is selected; and
 disabling to select a first resolution among the resolutions when the on state of the image quality mode is selected and enabling to select remaining resolutions among the resolutions.

10. The method of claim 9, further comprising:
 displaying a menu; and
 showing in a menu that a resolution higher than the threshold first resolution is disabled when the on state of the image quality mode is selected.

11. The method of claim 9, wherein the data playback apparatus is configured to connect by a communication module to an external apparatus comprising an image quality improvement function, and the method comprising:
 detecting a setting state of the image quality improvement function of the external apparatus via the communication module; and
 restricting the image quality mode selection in accordance with the detected setting state.

12. The method of claim 11, further comprising:
 displaying a menu; and
 showing in the menu that selecting an on state of the image quality mode is disabled when the image improvement function of the external apparatus is set to an on state.

13. A data playback control method comprising:
 playing image data;
 selecting a resolution among resolutions;
 selecting either on or off state of an image quality mode;
 disabling to select a first resolution among the resolutions when the on state of the image quality mode is selected;
 improving a quality of the image data to be played when the on state of the image quality mode is selected; and
 disabling to select the on state of the image quality mode when a second resolution is selected.

14. The method of claim 13, further comprising:
 displaying a menu; and
 showing in the menu that selecting the on state of the image quality mode is disabled when a resolution lower than the second resolution is selected.

* * * * *